(12) United States Patent
Roman et al.

(10) Patent No.: US 7,278,133 B2
(45) Date of Patent: Oct. 2, 2007

(54) INDEX-BASED PARAMETER ACCESS AND SOFTWARE FOR USING THE SAME

(75) Inventors: Manuel Roman, Sunnyvale, CA (US); Nayeem Islam, Palo Alto, CA (US)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/109,253

(22) Filed: Apr. 18, 2005

(65) Prior Publication Data

US 2006/0020689 A1   Jan. 26, 2006

Related U.S. Application Data

(63) Continuation-in-part of application No. 10/898,521, filed on Jul. 23, 2004.

(51) Int. Cl.
*G06F 9/44* (2006.01)
(52) U.S. Cl. .............. 717/120; 717/121; 707/1; 707/3; 707/4; 707/6; 707/200; 719/310
(58) Field of Classification Search .............. 719/310, 719/320, 330; 717/106, 120, 121, 143, 168; 707/1–6, 100, 103 R–103 Z, 104.1, 200
See application file for complete search history.

(56) References Cited

U.S. PATENT DOCUMENTS

| | | | | |
|---|---|---|---|---|
| 5,961,584 | A | * | 10/1999 | Wolf .......................... 718/103 |
| 6,083,276 | A | * | 7/2000 | Davidson et al. ........... 717/107 |
| 6,609,250 | B1 | | 8/2003 | Kasai et al. |
| 2005/0108206 | A1 | * | 5/2005 | Lam et al. ....................... 707/3 |
| 2005/0203876 | A1 | * | 9/2005 | Cragun et al. .................. 707/3 |

FOREIGN PATENT DOCUMENTS

| | | |
|---|---|---|
| EP | 0 990 983 A1 | 4/2000 |
| WO | WO 02/095576 A1 | 11/2002 |
| WO | PCT/US2004/038007 | 8/2005 |
| WO | PCT/US2005/013806 | 8/2005 |

OTHER PUBLICATIONS

Batory et al., The design and implementation of hierarchical software systems with reusable components, ACM Transactions on Software Engineering and Methodology, vol. 1, Issue 4 (Oct. 1992), pp. 355-398.*

(Continued)

*Primary Examiner*—Meng-Al T. An
*Assistant Examiner*—Andy Ho
(74) *Attorney, Agent, or Firm*—Blakely, Sokoloff, Taylor & Zafman LLP

(57) ABSTRACT

A method and apparatus for composing software are described. In one embodiment, the apparatus comprises a loader to obtain software structure data identifying a plurality of application components associated with requested functionality and to obtain software logic data indicating interaction rules between the plurality of application components, a parameter index generator to parse a description file and generate an index for each parameter of the plurality of application components, a parameter mapping to map input, output and state parameters to indices that are used by application components to access the input, output and state parameters, and a scheduler to coordinate an invocation of the plurality of application components at run time based on the software logic data.

25 Claims, 32 Drawing Sheets

The Parameter Does Not Exist

OTHER PUBLICATIONS

De Lucia, A., et al.: "Migrating Legacy Systems Towards Object-oriented Platforms", Software Maintenance, 1997, pp. 122-129.
Roman, M. et al.: "Dynamically Programmable and Reconfigurable Middleware Services", Middleware, 2004, pp. 372-396.
Zou, Y., et al.: "Towards a Web-centric Legacy System Migration Framework", 3rd Int'l Workshop on Net-Centric Computing (NCC): Migrating the Web, May 2001, pp. 1-5.

* cited by examiner

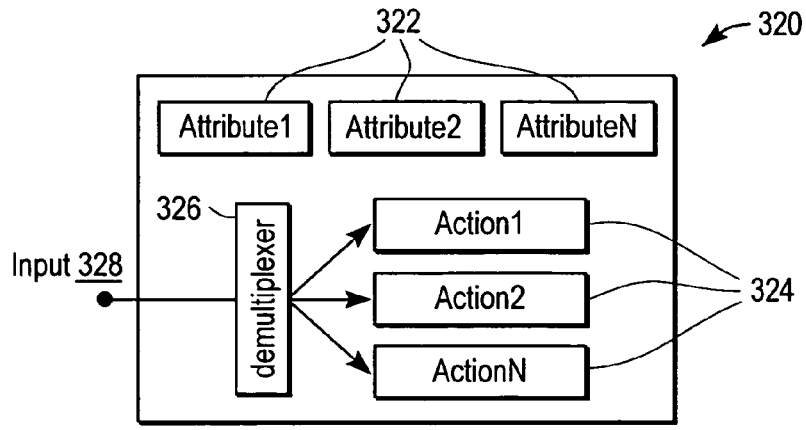

FIG. 3B

```
<MBB>
    <CLASS>
        <OS name ="EPOC">com.docomo.exorb.ObjectRegistrationProcessor</OS>
        <OS name ="WIN32">com.docomo.exorb.ObjectRegistrationProcessor</OS>
        <OS name ="WINCE">com.docomo.exorb.ObjectRegistrationProcessor</OS>
    </CLASS>
    <STATE>
        <NAME>distributedobjectregistry</NAME>
        <TYPE>TupleContainer</TYPE>
    </STATE>
    <INPUT>
        <NAME>objectname</NAME>
        <TYPE>string</TYPE>
        <NAME>object</NAME>
        <TYPE>Object</TYPE>
    </INPUT>
    <OUTPUT>
        <NAME>registeredobjects</NAME>
        <TYPE>integer</TYPE>
    </OUTPUT>
<MBB>
```

FIG. 3C

```
action Test
{
        outputParams = InvokeMBB(MBB1, inputParams);
        outputParams = InvokeMBB(MBB2, outputParams);
        char X = outputParams.get("X");
        if (X=='a')
                outputParams = InvokeMBB(MBB3, outputParams);
        if (X=='b')
                outputParams = InvokeMBB(MBB4, outputParams);
        outputParams = InvokeMBB(MBB5, outputParams);
}
```

```
<INTERPRETED_ACTION name="exampleAction">     <COMPILED_ACTION name="exampleAction">
    <STATE>                                       <NAME>exampleAction</NAME>
        <NAME>1</NAME>                            <MBBDESCRIPTOR>exampleAction.xml</MBBDESCRIPTOR>
        <MBB>MBB1</MBB>                       </COMPILED_ACTION>
        <NEXTSTATE>2</NEXTSTATE>
        <ERRORSTATE>end</ERRORSTATE>
    </STATE>
    <STATE>
        <NAME>2</NAME>
        <BBACTION>MBB2</BBACTION>
        <NEXTSTATE>
            <EXPRESSION>X=a</EXPRESSION>
            <NAME>3</NAME>
            <EXPRESSION>X=b</EXPRESSION>
            <NAME>4</NAME>
        </NEXTSTATE>
        <ERRORSTATE>end</ERRORSTATE>
    </STATE>
    <STATE>
        <NAME>3</NAME>
        <MBB>MBB3</MBB>
        <NEXTSTATE>5</NEXTSTATE>
        <ERRORSTATE>end</ERRORSTATE>
    </STATE>
    <STATE>
        <NAME>4</NAME>
        <MBB>MBB4</MBB>
        <NEXTSTATE>5</NEXTSTATE>
        <ERRORSTATE>end</ERRORSTATE>
    </STATE>
    <STATE>
        <NAME>5</NAME>
        <MBB>MBB5</MBB>
        <NEXTSTATE>end</NEXTSTATE>
        <ERRORSTATE>end</ERRORSTATE>
    </STATE>
</INTERPRETED_ACTION>
```

FIG. 4C

```xml
<ARCHITECTURE>
    <DOMAIN name="RootDomain">
        <STRUCTURE>RootDomainStructure.xml</STRUCTURE>
        <LOGIC>RootDomainLogic.xml</LOGIC>
        <DOMAIN name="Domain1">
            <STRUCTURE>Domain1Structure.xml</STRUCTURE>
            <LOGIC>Domain1Logic.xml<LOGIC>
            <DOMAIN name="Domain3">
                <STRUCTURE>Domain3Structure.xml</STRUCTURE>
                <LOGIC>Domain3Logic.xml</LOGIC>
            </DOMAIN>
            <DOMAIN name="Domain4">
                <STRUCTURE>Domain4Structure.xml</STRUCTURE>
                <LOGIC>Domain4Logic.xml</LOGIC>
            </DOMAIN>
            <DOMAIN name="Domain5">
                <STRUCTURE>Domain5Structure.xml</STRUCTURE>
                <LOGIC>Domain5Logic.xml</LOGIC>
            </DOMAIN>
        </DOMAIN>
        <DOMAIN name="Domain2">
            <STRUCTURE>Domain2Structure.xml</STRUCTURE>
            <LOGIC>Domain2Logic.xml</LOGIC>
        </DOMAIN>
    </DOMAIN>
</ARCHITECTURE>
```

FIG. 5C

```xml
<STRUCTURE>
    <ELEMENT>
        <NAME>MBB1</NAME>
        <MBBDESCRIPTOR>MicroBuildingBlock1.xml</MBBDESCRIPTOR>
    </ELEMENT>
    <ELEMENT>
        <NAME>MBB2</NAME>
        <MBBDESCRIPTOR>MicroBuildingBlock2.xml</MBBDESCRIPTOR>
    </ELEMENT>
</STRUCTURE>
```

FIG. 5D

```
<?xml version="1.0" ?>
<MBB>
    <CLASS>
        <NAME>example</NAME>
    </CLASS>
    <STATE>
        <NAME>state1</NAME>
        <TYPE>type1</TYPE>
    </STATE>
    <INPUT>
        <NAME>input1</NAME>
        <TYPE>type2</TYPE>
    </INPUT>
    <OUTPUT>
        <NAME>output1</NAME>
        <TYPE>type3</TYPE>
    </OUTPUT>
</MBB>
```

FIG. 29

```
public class example extends MicroBuldingBlock
{
    //Constants
    private int state1 = 0;
    private int input1 = 0;
    private int output1 = 0;

public void init()
    {
        initIndices();
    }

//Initialization method
    public void initIndices()
    {
        Hashtable mappings = hostingDomain.get("parametermappings");
        state1=((ParameterMappingItem)mappings.get("state1")).ParameterIndex;
        input1=((ParameterMappingItem)mappings.get("input1")).ParameterIndex;
        output1=((ParameterMappingItem)mappings.get("output1")).ParameterIndex;
    }

//MicroBuildingBlock method
    public void process(TupleContainer inputParams)
    {
    }
}
```

FIG. 30

```
public void process(TupleContainer inputParams)
{
        type2 inputParamValue = inputParams.getParameter(input1);
        type1 localValue = getStateMemory().getParameter(state1);
        . . .
        type3 outputParam = new type3("test");
        inputParams.putParameter(output1,outputParam);
}
```

FIG. 31

ParameterIndex
ParameterReferences

FIG. 32

The Parameter Does Not Exist

The Parameter Exists

INDEX-BASED PARAMETER ACCESS AND SOFTWARE FOR USING THE SAME

This application is a continuation-in-part of U.S. Nonprovisional application Ser. No. 10/898,521, entitled "Method and Apparatus for Composing Software," filed on Jul. 23, 2004.

FIELD OF THE INVENTION

The present invention relates to software; more particularly, the present invention relates to index-based parameter access for use by software.

BACKGROUND OF THE INVENTION

Mobile phone functionality has evolved tremendously over the last several years. Initially, there was just voice transmission. Then, short messages and web browsing were added. Later, interactions with vending machines and multimedia messaging became available. Most recently, video conferencing, Internet access, and interaction with the surrounding physical environment became possible. The evolution of mobile phones and wireless-enabled handheld devices, as well as the increasing proliferation of wireless networks, is changing users' traditional understanding of computers. The notion of desktop computing is slowly evolving into a more dynamic model. Mobile phones are capable of connecting to wireless networks and have enough processing power to perform tasks previously reserved for servers and workstations. As such, mobile phones became users' digital companions that operate in the context of individual users and assist them with everyday tasks. Furthermore, increasing speed of wireless transmissions enable the development of applications that allow mobile phones to interact with distributed services (e.g., Web Services) and access and share rich multimedia contents.

The increasing relevance of software services demands more sophisticated operation systems for mobile phone devices. These operation systems provide support for application development based on languages such as Java (MIDP 2.0, DoJa, Personal Java), C#, C, and C++. Furthermore, these operations systems provide support for middleware services that assist in the development of distributed applications. The increasing mobile phone sophistication implies increasing device configuration complexity, higher probability of software errors, and the requirement to enhance existing software at runtime. For example, a mobile phone may be equipped with a digital camera, support transmission of pictures (known as MMS), and support Internet connectivity, which allows browsing Web and WAP pages, downloading and sending e-mail, and accessing services running on the Internet. However, before using these services a user must configure his or her terminal. This configuration task typically is a tedious and error prone process that involves calling the customer support center and following a number of instructions, including entering parameters such as host names, IP addresses, user names, and passwords.

In addition, as software platforms become larger, so does the probability of software errors. According to recent studies, 10 percent of mobile phones are returned due to software problems. With over 1200 million subscribers worldwide, it means that over 120 million phones are returned every year. That is, 120 million users have to take their device to a customer support center to update their phones. This is very costly for carriers and frustrating for mobile phone users.

Further, software vendors periodically provide new functionality for existing mobile software. For example, an existing mail client may provide support for additional attachments, or a web browser may provide additional functionality to manipulate scripts. Again, requesting mobile phone users to take their phone to a customer support center for software update is inconvenient for the users.

There are solutions that address some of these problems. For example, some existing products provide functionality to update the mobile phone's firmware at runtime. They do it by comparing the image of the existing firmware with the image of the new firmware, calculating the binary differences between the two images, and updating the image of the existing image with the calculated differences. However, this approach requires user intervention to implement the update, can only replace the entire software image (rather than certain logic or structural properties), and can only perform the update when the system is stopped.

An exemplary technique for replacing processes at runtime is described in U.S. Pat. No. 4,954,941. This technique involves registering processes with a signaling mechanism. When the signaling mechanism generates a signal, a relevant process can replace itself with an updated binary image. However, the technique described in U.S. Pat. No. 4,954,941 does not allow for replacement of individual fragments of processes, may result in corruption of data being processed, and cannot support dynamic software composition. In addition, the abovementioned technique lacks a mechanism for managing the state, structure and logic of a software application.

U.S. Pat. No. 5,155,847 describes an exemplary technique for replacing software that resides on a collection of client devices. The software is updated using a central host that stores the updates and generates patches for different client devices. A client agent connects to the host, retrieves the latest patches and installs these patches on relevant client devices. However, the technique described in U.S. Pat. No. 5,155,847 requires that an affected application be stopped during the update process. In addition, this technique cannot support remote state configuration, dynamic software composition, and inspection and modification of the structure and logic of the system.

U.S. Pat. No. 5,359,730 describes a technique for replacing operating system (OS) components at runtime. The OS components are replaced using hardware traps that redirect the invocation of OS components to corresponding modules. However, the technique described in U.S. Pat. No. 5,359,730 is platform dependent, and lacks the capability of supporting dynamic software composition and inspection of the system at runtime.

U.S. Pat. No. 5,732,275 describes a technique for updating software residing on a client device. This technique relies on modifying the application launcher to cause the latest application version to be downloaded and installed before the execution of the application. The major limitation of the technique described in U.S. Pat. No. 5,732,275 is that the software can only be updated at launch time, and not while the software is running.

U.S. Pat. No. 6,466,942 and U.S. patent application Publication No. US20030167255A1 present techniques that leverage indices to improve the performance of the system. U.S. Pat. No. 6,466,942 describes a mechanism to use indices to speed up access to computer-stored records in relational databases. U.S. patent application Publication No. US20030167255A1 discloses a method to recommend new or improved performance indexes for use by an IBM mainframe DB2 database server for a given set of SQL statements. The recommendations are calculated based on a single call of the DB2 optimizer for each SQL statement with the existing index set, parsing of the SQL statements, the filter factors of the SQL statement predicates, and the getpage workload of an SQL statement. The getpage workload of an SQL statement is the read/change activity on each table and each index currently used for all invocations of an SQL statement. The XOP program computes new and improved performance indexes based on the getpage workload of all relevant SQL statements and does not use the DB2 optimizer to determine the usefulness of potential indexes.

SUMMARY OF THE INVENTION

A method and apparatus for composing software are described. In one embodiment, the apparatus comprises a loader to obtain software structure data identifying a plurality of application components associated with requested functionality and to obtain software logic data indicating interaction rules between the plurality of application components, a parameter index generator to parse a description file and generate an index for each parameter of the plurality of application components, a parameter mapping to map input, output and state parameters to indices that are used by application components to access the input, output and state parameters, and a scheduler to coordinate an invocation of the plurality of application components at run time based on the software logic data.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3B is a block diagram of one embodiment of a structure of an MBB.

FIG. 3C illustrates an exemplary XML description file for an MBB.

FIG. 4C illustrates an exemplary XML description file providing a definition of an interpreted and compiled action.

FIG. 5C illustrates an exemplary XML descriptor file that provides the definition of the software architecture.

FIG. 5D illustrates an exemplary XML descriptor file that provides the definition of the software structure for a domain.

FIG. 29 depicts an example of a Java micro building block (MBB) wrapper.

FIG. 30 illustrates an example of a MBB XML description file

FIG. 31 illustrates example code that accesses three parameters.

FIG. 32 illustrates is an example of a parameter mapping item.

DETAILED DESCRIPTION OF THE PRESENT INVENTION

Figure 1:
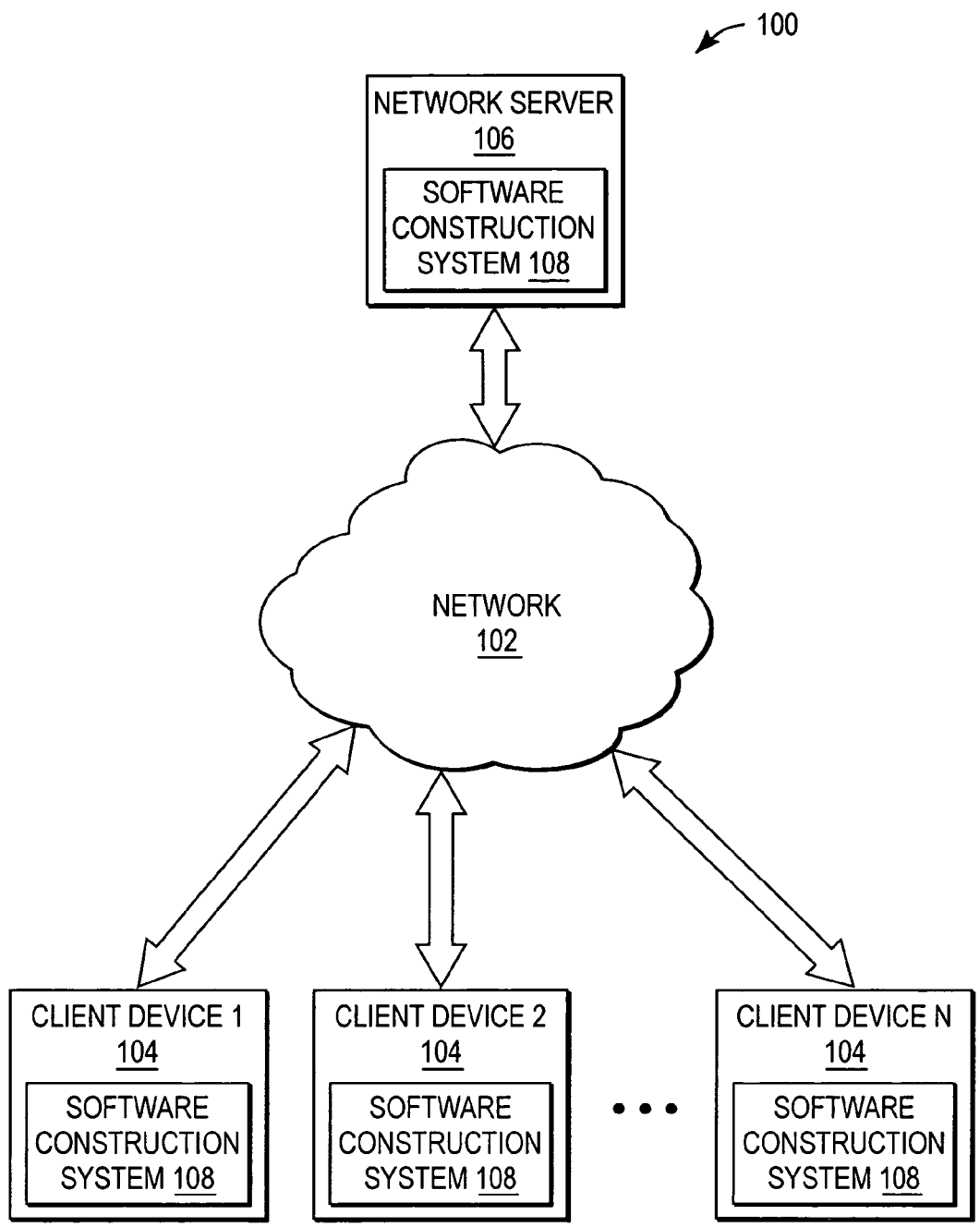
FIG. 1 is a block diagram of one embodiment of a system for facilitating dynamic construction of reconfigurable software.

Techniques for index-based parameter access and method and apparatus for composing software that uses the same. In one embodiment, the software is composed of Micro Building Blocks (MBB) use index-based parameter access techniques to enable access to various parameters. The techniques reduce the time required to access input, output, and state parameters by replacing the hash table described above with an integer indexed array and a collection of dynamically generated indices. In one embodiment, the generation of the indices is automatically managed using MBB XML description files. Furthermore, in one embodiment, these techniques provide functionality to generate code automatically that hides the use of indices from an application developer.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Prior to describing the index-based parameter access techniques referenced above, a mechanism is described below that allows software to be assembled, reconfigured, migrated and adapted at run time. FIG. 1 is a block diagram of one embodiment of a system 100 for facilitating dynamic construction of reconfigurable software.

Referring to FIG. 1, the system 100 includes a network server 106, a network 102, and client devices 104 coupled to the network server 106 via the network 102. Client devices 104 are interactive communication devices. In one embodiment, the network 102 is a wireless network, and client devices 104 are mobile devices such as wireless telephones, palm-sized computing devices, PDAs, or Internet-capable appliance remote controllers. Such communication devices may communicate wirelessly with the network server 106 and each other via the wireless network 102. In an alternative embodiment, the network 102 is a non-wireless network (e.g., the Internet), and client devices 104 are non-wireless devices such as PC systems, PDAs, consumer electronic devices, etc. A wide variety of communication techniques known in the art can be used to enable communication between the client devices 104 and the network server 106.

A software construction system 108 may reside on any client device 104. In addition, the software construction system may reside on the network server 106. The software construction system 108 is responsible for composing software (e.g., applications or services) for the functionality requested by a user of the client device 104 or the network server 106, or by some other system or device. The software construction system 108 composes software by obtaining software structure data identifying a collection of application components that implement the requested functionality, obtaining software logic data indicating the interaction rules among the application components, storing the software structure data and the software logic data in a storage area, and then using the software logic data to coordinate the invocation of the application components specified by the software structure data.

In one embodiment, the application components (also referred to herein as micro building blocks or MBBs) are the smallest addressable functional units in the system. Each MBB receives a collection of input parameters, executes an action that might affect its state, and generates a collection of output parameters. An MBB does not store references to other MBBs. Hence, if an MBB is replaced with a new MBB, other MBBs do not need to be notified about the replacement.

By maintaining, in a designated storage area, information about all components of the software structure and information about the interaction rules among these components, the software construction system 108 explicitly externalizes the structure and the logic of the composed software. In addition, in one embodiment, the software construction system 108 explicitly externalizes the state of the composed software by maintaining in the storage area the internal state attributes of individual components, the internal software execution state (the state of a presently executing component), and configuration parameters that are required to execute the software (e.g., user preferences and execution directories).

The explicit externalization of the software state supports configurability of software (i.e., provides the ability to modify the software internal state). For example, a customer support representative may connect to the user's mobile phone and modify software parameters to configure the mobile phone remotely without requiring user intervention. Other examples of configurability may include modifying references to remote objects, buffer sizes, and network parameters. The explicit externalization of the software state allows for inspection of the software state at runtime. This information can then be used to configure the software while a user is accessing the application.

In one embodiment, the software construction system 108 provides a user interface allowing a designated person to browse the software state and specify desired changes.

In addition, the externalization of the software state, logic and structure supports software updateability (i.e., allows correcting or improving the behavior of software by replacing specific components or modifying the execution logic of the software). In particular, state externalization allows for modifying the values of certain parameters in the system (for example, buffer sizes) to correct a wrong behavior. Structure externalization allows replacing software components at runtime, and logic externalization provides functionality to modify the interaction rules among the components of the software. Accordingly, the software can be updated without the need to restart the system. This applies to the system utilizing any type of memory (e.g., electrical memory, magnetic memory, optical memory, etc.).

In one embodiment, the user interface provided by the software construction system 108 allows a user to view the list of application components, the interaction rules between the application components and the software state, and to specify desired changes to any pieces of this data.

Further, the explicit externalization of the logic, structure, and state of the software supports automatic software upgrading. That is, the application logic may be modified by accessing the explicitly externalized logic and introducing changes (e.g., via a user interface). The runtime infrastructure may then update the new logic rules and modify the behavior of the software accordingly. In addition, software components may be modified or removed by updating the explicitly externalized software structure and modifying the logic of the software to add new interaction rules for the new components or to edit existing interaction rules to no longer use the deleted components.

Dynamic Construction of Software

Figure 2A:
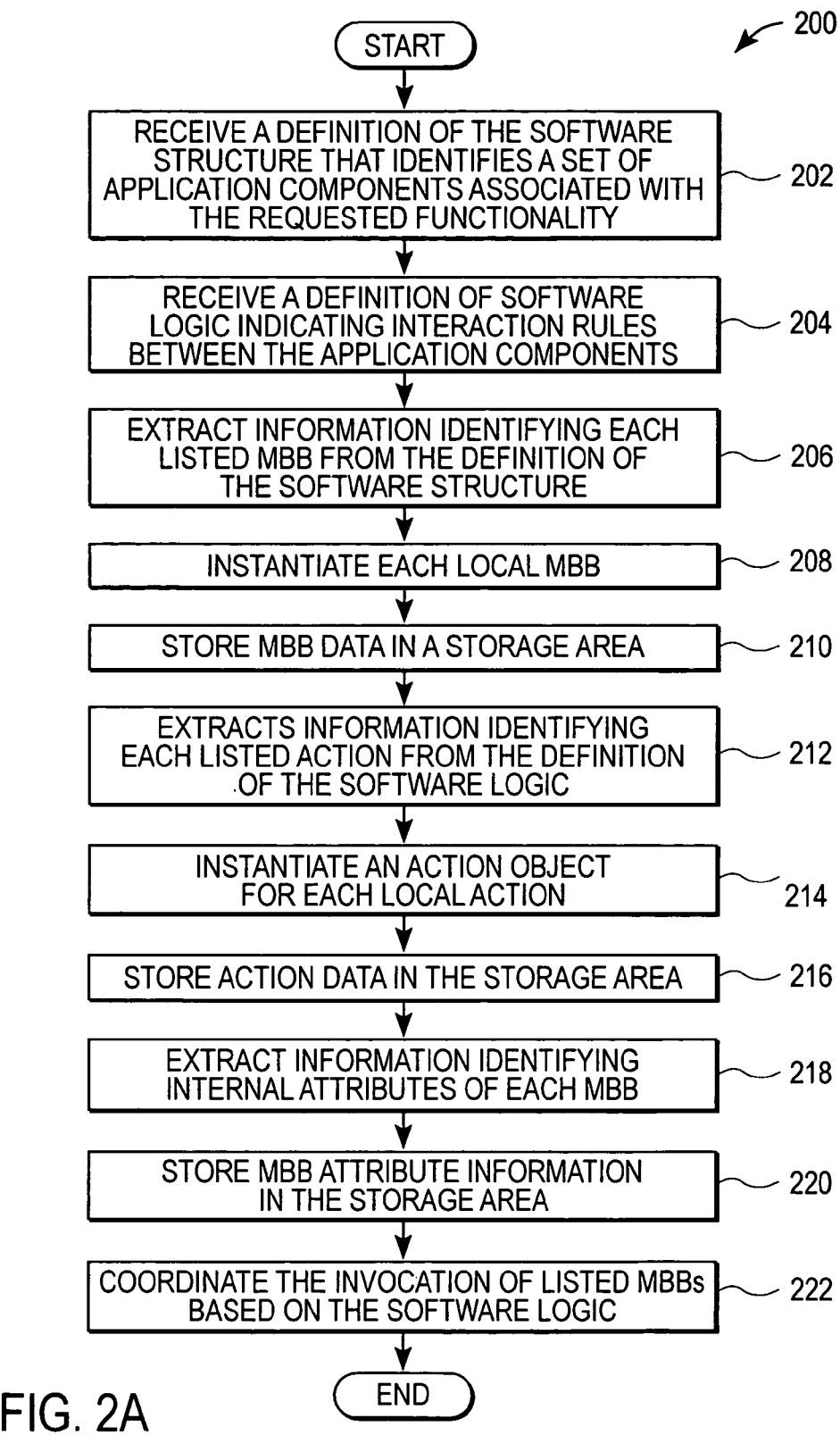
FIG. 2A is a flow diagram of one embodiment of a process for dynamically constructing software.

FIG. 2A is a flow diagram of one embodiment of a process 200 for dynamically constructing software. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 200 is performed by a software construction system 108 of FIG. 1.

Referring to FIG. 2A, processing logic begins with receiving a definition of the software structure that identifies a set of application components associated with the requested functionality (processing block 202). In one embodiment, the definition of the software structure is presented in XML. Alternatively, the definition of the software structure may be presented in various other computer languages (e.g., Java, HTML, C++, etc.). In one embodiment, the application components are selected by a user. Alternatively, the application components are selected by processing logic or some other system according to the desired functionality. In one embodiment, an application component (or MBB) is the smallest addressable functional unit in the system. An exemplary structure of an MBB will be discussed in greater detail below in conjunction with FIGS. 3A and 3B.

At processing block 204, processing logic receives a definition of software logic indicating interaction rules between the application components. In one embodiment, the definition of the software logic is presented in XML. Alternatively, the definition of the software structure may be presented in various other computer languages (e.g., Java, HTML, C++, etc.). In one embodiment, the software logic is defined by actions that specify the execution order of the MBBs. In one embodiment, the MBB execution order is specified by an interpreted action. Alternatively, the MBB execution order is specified by a compiled action. An interpreted action is a deterministic directed graph (only one possible transition from every node) in which nodes are MBBs denoting execution states, and edges define the transition order. A compiled action is a code fragment that specifies the MBB invocation order. Actions will be discussed in more detail below in conjunction with FIGS. 4A–4C.

Next, processing logic extracts information identifying each listed MBB from the definition of the software structure (processing block 206) and, in one embodiment, uses this information to instantiate each local MBB (processing block 208). A local MBB is an MBB residing on the same device as the software construction system 108.

At processing block 210, processing logic stores MBB data in a storage area. In one embodiment, the MBB data includes an MBB identifier (e.g., the MBB name) and an MBB reference (local or remote) for each MBB. In one embodiment, a notion of "domain" is used to refer to a collection of related MBBs in the storage area, and each MBB identified in the MBB data is registered (i.e., assigned a unique name) in the domain. In this embodiment, a local object is an object residing in the current domain. Domains will be discussed in more detail below in conjunction with FIGS. 5A–5D.

Next, processing logic extracts information identifying each listed action from the definition of the software logic (processing block 212) and, in one embodiment, uses this information to instantiate a collection of action objects for each local action (processing block 214). In one embodiment, an action object stores a directed graph in which nodes represent MBBs and edges define the transition order. In one embodiment, each action is associated with an action state object at run time. Actions use this object to store input and output parameters, as will be discussed in more detail below.

At processing block 216, processing logic stores action data in the storage area. In one embodiment, the storage data includes an action object identifier (e.g., the name) and an action object reference (local or remote) for each MBB. In one embodiment, each action identified in the action data is registered in the domain.

In one embodiment, processing logic also extracts information identifying internal attributes of each MBB (processing block 218) and stores this information in the storage area (processing block 220). In one embodiment, the MBB attribute information is extracted from a definition of a relevant MBB received by processing logic for each MBB. Alternatively, this information is extracted from the definition of the software structure received at processing block 202. In one embodiment, the MBB attribute information includes an identifier and a value of each MBB attribute for all the MBBs. In addition, the MBB attribute information identifies input and output parameters of each MBB. In one embodiment, each attribute identified in the MBB attribute information is registered in the domain.

At processing block 222, processing logic coordinates the invocation of listed MBBs based on the software logic, as will be discussed in more detail below in conjunction with FIG. 6.

Figure 2B:
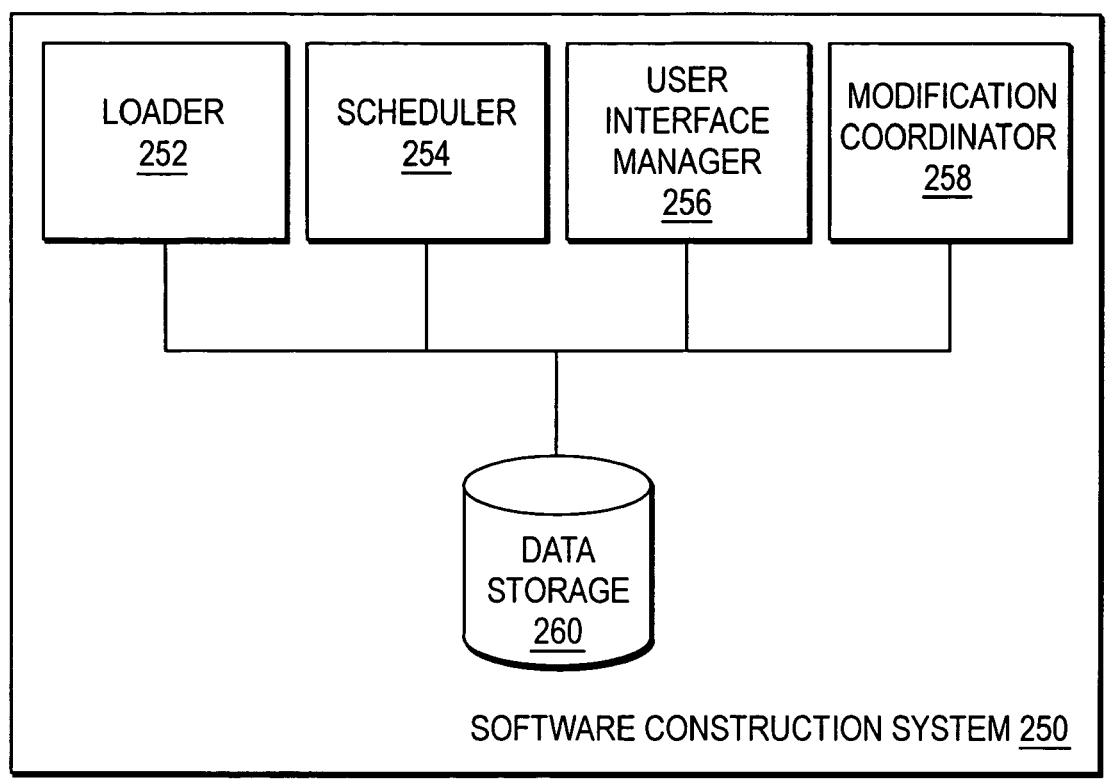
FIG. 2B is a block diagram of one embodiment of a software construction system.

FIG. 2B is a block diagram of one embodiment of a software construction system 250. In one embodiment, the software construction system includes a loader 252, a scheduler 254 and a data store 260.

The loader 252 is responsible for obtaining data identifying a collection of MBBs that implement the requested functionality (MBB data), data identifying the interactions rules among these MBBs (logic data), and data identifying state attributes of each MBB (state data). In one embodiment, the loader 252 obtains this set of data by parsing the definition of the software structure, the definition of the software logic and the definition of each relevant MBB. These definitions may be downloaded to the software construction system 250 from a different application running on the same device (e.g., the same mobile device), or from a server or some other device (e.g., some other mobile device). In another embodiment, the definition of the software structure includes state information for each MBB, and definitions of MBBs are not used.

In one embodiment, the loader 252 is also responsible for instantiating local MBBs and action objects based on the obtained set of data, and storing the MBB data, the logic data and the state data in the data store 260. In one embodiment, the data store 260 represents a domain having a structure memory, a logic memory and a state memory, as will be discussed in more detail below in conjunction with FIG. 5A. In one embodiment, the data is stored in the data store 260 in the form of name and value tuples. In particular, the MBB data includes MBB name/MBB reference tuples, the logic data includes action name/action reference tuples, and the state data includes attribute name/attribute value tuples.

The scheduler 254 is responsible for coordinating the invocation of the MBBs based on the logic data. In one embodiment, the scheduler 254 is also responsible for maintaining and exporting information about the execution state of the composed software. This information specifies, for example, a currently executed action, the MBB of the currently executed action, and the parameters associated with the action (e.g., input parameters of the action and parameters generated by the action's MBBs).

In one embodiment, the scheduler 254 is implemented as an MBB. Consequently, the state of the scheduler 254 is accessible and can be modified at runtime as any other MBB. The ability to replace the scheduler 254 allows developers to provide different execution semantics. For example, they can choose a scheduler that supports transparent local or remote MBB invocation, thereby simplifying runtime software partitioning. In addition, they can choose a scheduler that checkpoints the parameters and state after every MBB, thereby providing fault tolerant semantics. Furthermore, they can select a real time scheduler that defines action execution boundaries and provides guarantees on the action execution times. The ability to select a specific scheduler combined with dynamic software replacement capabilities simplifies the construction of adaptive software that can modify its execution model according to the execution conditions and external requirements.

In one embodiment, the software construction system 250 also includes a user interface manager 256 and a modification coordinator 258. The user interface manager 256 is responsible for providing a relevant user interface and receiving user input via the user interface. A user interface may specify a list of applications available to a user and a list of components for each application. The user may use this user interface to select application components and request to move them to a different device. A user interface may also specify a list of application partitioning schemes and allow a user to choose one to customize an application quickly. A user interface may also allow users to browse the software state and specify desired changes to reconfigure the software. In addition, the user interface may allow a user to view the list of application components, the interaction rules between the application components and the software state, and to specify desired changes to any pieces of this data to update the software. Further, the user interface may allow a user to request changes to the software logic or application components to upgrade the software.

The modification coordinator 258 is responsible for processing requests for reconfiguration of software, update of software or upgrade of software, and modifying relevant information in the data store 260 in response to such requests. In one embodiment, the modification coordinator 258 cooperates with the scheduler 254 to implement the changes. For example, the modification coordinator 258 may request the scheduler 254 to determine a safe component swapping state for a component requested to be modified and then modify the component in the data store 260.

Accordingly, the software construction system 250 assembles software at runtime and provides support for on-the-fly modification of its logic, structure, and state. In particular, the explicit execution state externalization provides the software construction system 250 with detailed information that it can leverage to calculate safe component swapping states without any support from the developer. The software construction system 250 controls component invocation and therefore knows when it is safe to introduce changes. In addition, the explicit software state externalization eliminates the requirement of state transfer. When the new component is inserted, it is automatically connected to the previous component's state. Furthermore, because components do not store references to other components, there is no need to update components' references. Similarly, because application components are addressed by name and not by reference, components are unaffected by changes to the software.

Application components or MBBs will now be discussed in more detail with reference to FIGS. 3A–3C.

Figure 3A:
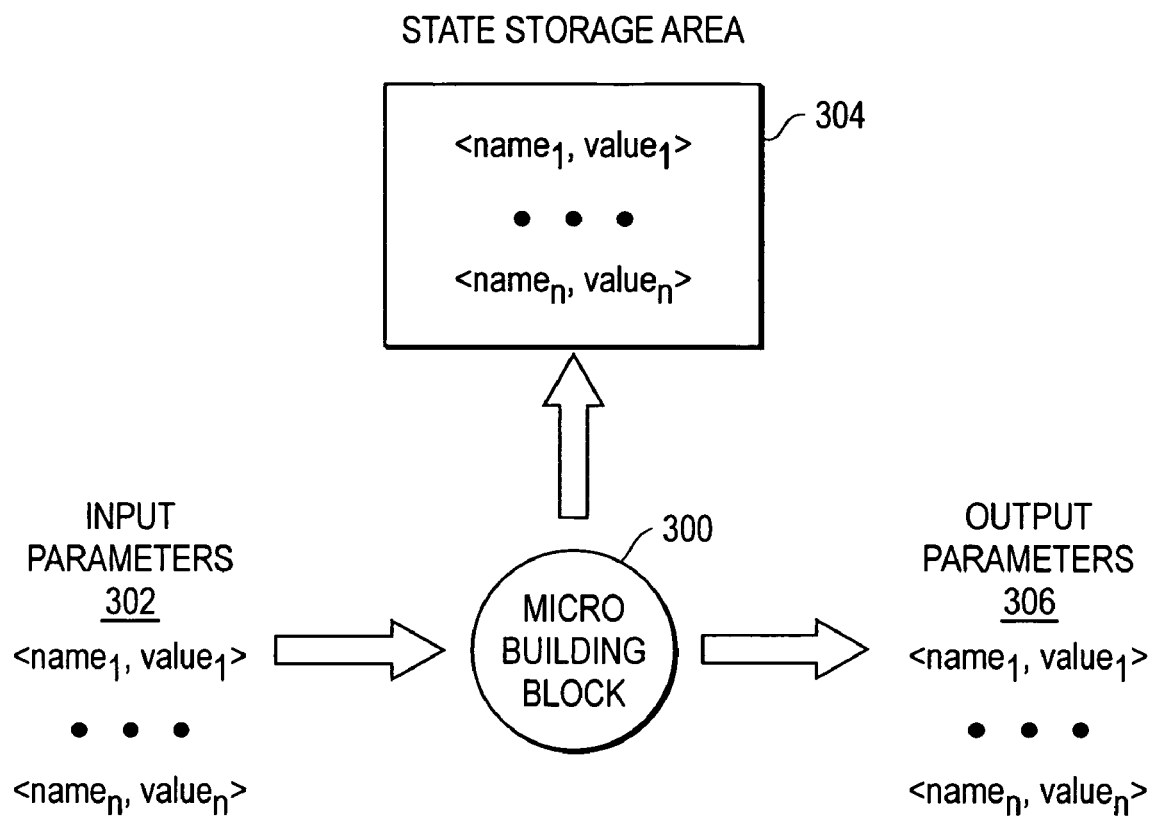
FIG. 3A illustrates an exemplary operation of a micro building block (MBB).

FIG. 3A illustrates an exemplary operation of an MBB 300, which receives input parameters 302, executes an action that may affect its internal state parameters 304, and generates output parameters 306.

FIG. 3B is a block diagram of one embodiment of a structure of an MBB 320. Referring to FIG. 3B, the MBB 320 is an entity consisting of a set of one or more methods 324, a set of zero or more attributes 322, and a demultiplexer 326. A method 324 is an algorithm that implements a task. A method 324 requires a set of zero or more input values and generates a set of zero or more output values. In one embodiment, the demultiplexer 326 is the MBB's entry point that receives an input parameter 328 and extracts a corresponding MBB method 324. In one embodiment, each attribute 322 is a name and value tuple. The value is a variable that stores information required by the method to implement its algorithm. Attributes 322 are stored in an external storage area and may be accessed by name.

In one embodiment, every MBB is described in an application component definition. This definition specifies, for a relevant MBB, a list of input parameters, a list of output parameters, a list of state attributes, and a platform dependent field specifying an entity that implements the MBB (e.g., a Java class file, a NET object, a DLL, etc.). FIG. 3C illustrates an exemplary XML description file for an MBB "RegisterObject", with the class tags denoting the implementation for each platform, the state tags specifying a name and type tuple for each state attribute, the input tag describing the input parameters in terms of name and type tuples, and the output tag denoting the parameters that the MBB generates in terms of name and type tuples.

Figures 4A, 4B:
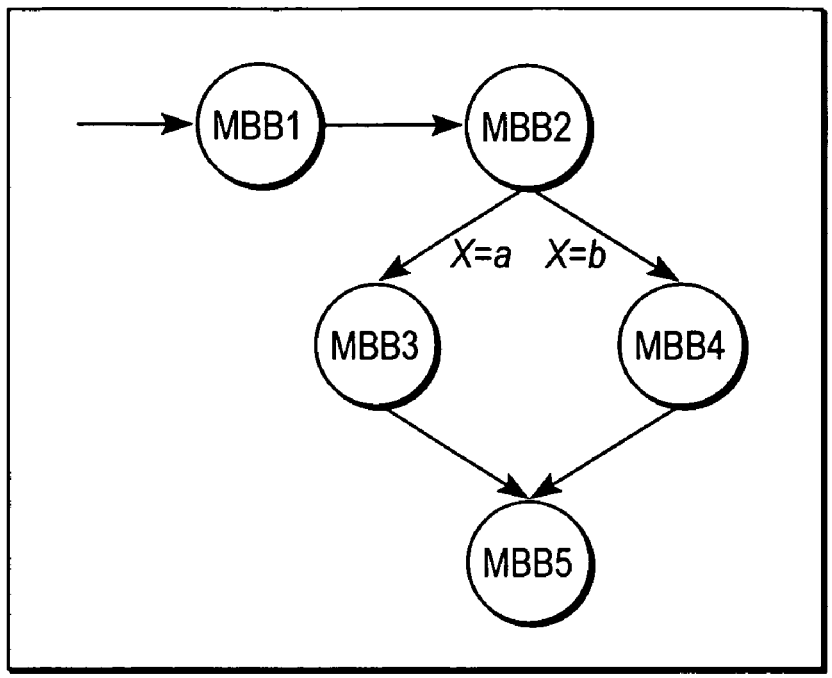
FIG. 4A illustrates an exemplary interpreted action.
FIG. 4B illustrates an exemplary compiled action.

Actions will now be discussed in more detail with reference to FIGS. 4A–4C.

As discussed above, actions specify the MBB execution order and therefore define the logic of the software. An action may be an interpreted action or a compiled action. An interpreted action is a deterministic directed graph with nodes representing MBBs that denote execution states, and edges defining the transition order. Every edge has an associated conditional statement that is evaluated at runtime to determine the next transition. Conditional statements can refer to parameters generated by MBBs (output parameters). For nodes with multiple out edges, only one of the edges can evaluate true at runtime (deterministic graph). By default, the value of this conditional statement is true. Action graphs typically have one start node, intermediate nodes, and one end node. The start and end nodes (the end node denotes the action graph terminates) are part of every graph traversal. The intermediate nodes depend on the traversal of the graph according to the conditional statements assigned to the edges. Action graphs include additional nodes and edges that specify the transitions in case of errors. That is, if no errors are detected, the system uses the default action graph. However, if execution errors are detected, then the system uses the error nodes and edges. For example, each node may have an additional edge that goes to the end state to cause the action to be terminated if an error is detected. Action graphs may define more sophisticated behaviors (e.g., support loop statements, such as "while", "for", and "repeat"). Executing an interpreted action corresponds to traversing the graph FIG. 4A illustrates an exemplary interpreted action, in which MBB1 is the start node. The action starts with the invocation of MBB1, continues with the invocation of MBB2, then depending on the value of 'X' it invokes MBB3 or MBB4, and finally, it invokes MBB5. The value of the variable 'X' is either provided by the client invoking the action or it is an output parameter generated by MBB1 or MBB2. This value is stored as part of the action execution state that will be discussed in greater detail below.

Interpreted actions provide reflection at the execution level by exporting information about the current execution state, and by providing support to modify the action graph at runtime. Furthermore, the explicit representation simplifies reasoning about the logic of the system, supports static analysis, and allows third parties to modify the behavior of the system by adding or removing states and configuring the graph.

A compiled action is a code fragment that specifies the MBB invocation order. FIG. 4B illustrates an exemplary compiled action that corresponds to the interpreted action depicted in FIG. 4A.

Compiled actions invoke MBBs using a designated library. In one embodiment, the designated library receives an MBB name and a collection of input tuples, and invokes the specified MBB with the provided input parameters. This mechanism allows the software construction system to take control over MBB invocation, allowing safe replacement of MBBs. In one embodiment, the compiled action code is provided as an MBB that is registered with the software construction system. Therefore, invoking the action corresponds to invoking the MBB, thus allowing the software construction system to replace action definitions at runtime.

FIG. 4C illustrates an exemplary XML description file providing a definition of an interpreted (left) and compiled (right) action "exampleAction".

Referring to FIG. 4C, for the interpreted action, every state has a name, the name of the MBB invoked at the state, the next state if no exceptions are raised, and the next state when exceptions are raised. For conditional transitions (e.g., state 2), a conditional statement is assigned to each state name. It is also possible to use conditional transitions for the error state transitions. In one embodiment, an ActionState object is created for each action to store the information associated with the action state, i.e., the state name, the name of the MBB invoked at the state, the next state if no exceptions are raised, and the next state when exceptions are raised.

The compiled action description includes the name of the action and the MBB that implements it.

Both interpreted and compiled actions support MBB replacement. In particular, one major requirement to automate runtime MBB replacement is detecting the system has reached a safe component swapping state (i.e., an execution state in which the target component is not referenced by any other component) and avoiding access of the swapped component by the remaining components. With both interpreted and compiled actions, safe component swapping states can be determined automatically. With interpreted actions, the interpreter explicitly invokes the MBBs. Compiled actions use a designated library to invoke MBBs. In both cases, the system gets control of the invocation and therefore can safely replace MBBs.

In addition, both interpreted and compiled actions contribute to the updateability and upgradeability of software. Updating an action corresponds to replacing an existing action, or in the case of interpreted actions, modifying the execution graph. Upgrading the system implies adding new actions, or in the case of interpreted actions, modifying the action graph to incorporate or modify states.

One difference between interpreted and compiled actions is the runtime manipulation granularity. Compiled actions cannot be modified at runtime, i.e., it is not possible to add, remove, or modify transition states. Changing the behavior of compiled actions requires replacing their associated MBBs, i.e., replacing the action code. Furthermore, it is not possible to inspect compiled actions at runtime, and therefore it is not possible to learn about the current execution state, or learn about the action behavior. With interpreted actions, the graph provides enough information to learn about the behavior of the action. However, compiled actions execute faster than interpreted actions because they do not require an interpreter to drive their execution. Depending on the required functionality of the composed software, the software construction system may use either interpreted or compiled actions.

Domains will now be discussed in more detail with reference to FIGS. 5A–5C. A domain is an abstraction that aggregates collections of related MBBs. A domain provides a storage area to store the structure of the domain (list of MBBs), the logic of the domain (list of actions), and the state of the domain (MBBs state attributes and execution state values). Domains can be composed hierarchically to facilitate manipulation of collections of MBBs as a single unit (for example, move, suspend, and resume).

Figure 5A:
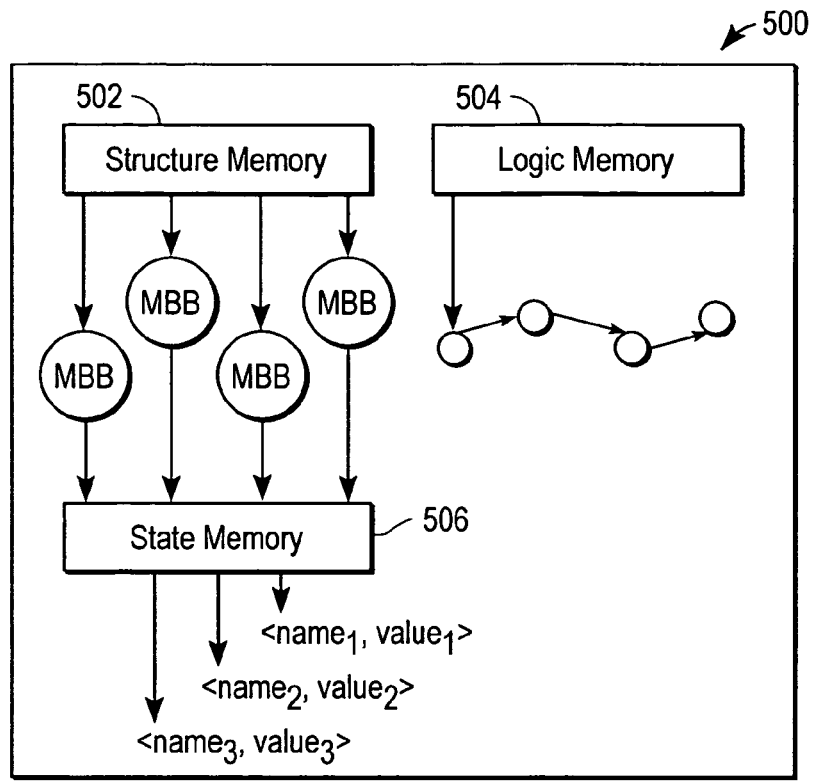
FIG. 5A illustrates an exemplary structure of a domain.

FIG. 5A illustrates an exemplary structure of a domain 500.

Referring to FIG. 5A, the domain 500 includes a structure memory 502, a logic memory 504 and a state memory 506. Each memory stores name and value tuples. The structure memory 502 maintains a collection of tuples that correspond to MBBs registered in the domain. The tuple name refers to the name of the MBB (every MBB is assigned a name at registration time), and the value stores the reference to the MBB. The reference can be a local pointer or a pointer to a remote MBB. In one embodiment, the software construction system makes local or remote invocation transparent to developers.

The logic memory 504 stores a list of actions exported by the domain. Similarly to the structure memory, the logic memory 504 refers to actions by name, and the value can be a local pointer or a remote reference.

The state memory 506 stores the state attributes for the MBBs registered in the domain. The state memory 506 refers to attributes by name, and the value is the value of the attribute. During the MBB registration, the system assigns a pointer to the state memory 506 to the MBB. MBBs belonging to the same domain share the same state memory 506.

Domains can be composed hierarchically to simplify the organization of large collections of MBBs. Domain memories store a reference (name and value tuple) to the domain memories of the registered sub-domains, and they also store a reference to the root domain memory. FIG. 5B illustrates an exemplary hierarchical composition of domains.

Figure 5B:
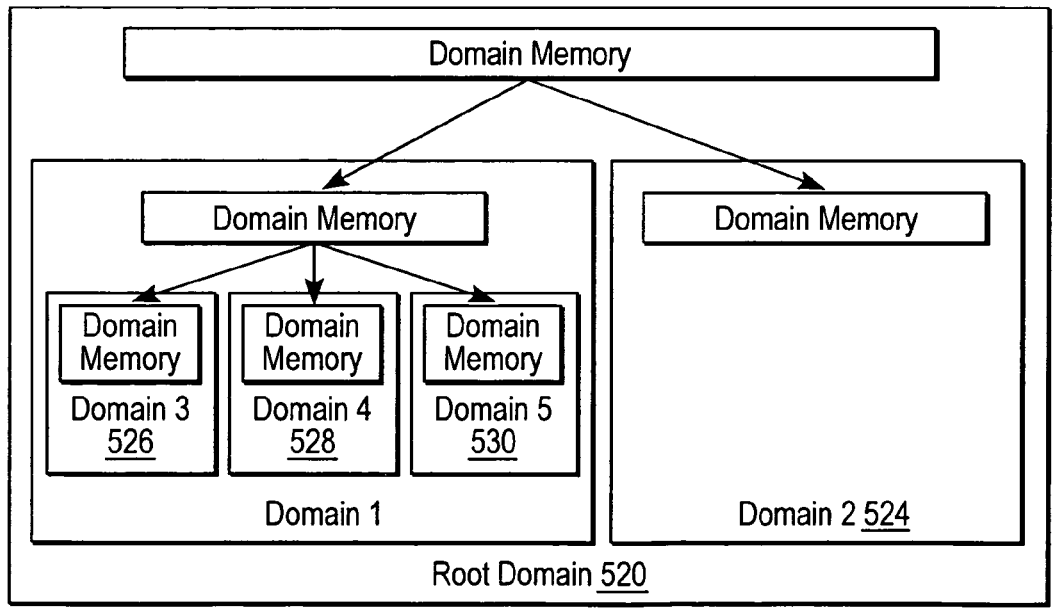
FIG. 5B illustrates an exemplary hierarchical composition of domains.

Referring to FIG. 5B, a root domain 520 has two sub-domains (domains 522 and 5242) and the domain 522 has three sub-domains (domains 526, 528 and 530).

In one embodiment, the default visibility policies dictate that a domain have access to the sub-domain memories. For example, the root domain 520 may have access to all the domain memories of the system (i.e., domains 522 through 530), while the domain 530 has access to its own domain memory only. It is possible to modify the visibility policies (e.g., to allow sub-domains to access their parents or siblings' domain memories).

In one embodiment, a definition of software architecture is used to describe the domain hierarchy maintained by the software construction system. FIG. 5C illustrates an exemplary XML descriptor file that provides the definition of the software architecture.

Referring to FIG. 5C, each domain entry in the architecture descriptor points to two additional files, structure and logic descriptors, which specify the MBBs and actions registered in the domain. A logic descriptor was discussed above in conjunction with FIG. 4C. A structure descriptor provides a definition of the software structure for a single domain. FIG. 5D illustrates an exemplary XML descriptor file that provides the definition of the software structure for a domain.

Referring to FIG. 5D, the structure descriptor provides a list of MBBs that belong to a domain. The descriptor includes a list of names and MBB descriptors. An MBB descriptor is a document providing the definition of a relevant MBB (e.g., an MBB descriptor shown in FIG. 3C). In one embodiment, the MBB descriptor is used to instantiate a relevant local MBB. All MBBs are registered in the domain structure memory as a <name, MBB reference> tuple. The MBB name is used as the key to access the MBB.

The execution of actions will now be discussed in more detail. The execution of an interpreted action relies on an interpreter. Executing a compiled action corresponds to invoking an MBB, and therefore does not require an interpreter.

An interpreted action externalizes the logic of the system and provides information about the MBB invocation sequence required to execute a functional aspect of the software. In one embodiment, the execution of an interpreted action is performed by a scheduler 254 of FIG. 2B, which drives the execution of the composed software using the action's data as an MBB invocation schedule. In one embodiment, the action's data is an action definition (e.g., deterministic finite state automata (DFSA)) that specifies the order of invocation of MBBs. The scheduler maintains and exports information about the execution state of the software. This information specifies, for example, a currently executed action, the MBB of the currently executed action, and parameters associated with the action (e.g., the input parameters and parameters generated by the action's MBBS).

In one embodiment, each action is associated with an action state object. Actions use this object to store the input and output parameters associated to the action execution. Parameters are provided by the clients invoking the action and are also generated by MBBs as the result of their invocation. MBBs consume parameters stored in the action state object to implement their algorithm. Saving the parameters generated during the action invocation and synchronizing the MBB access to their state attributes allows clients to invoke actions concurrently.

Figure 6:
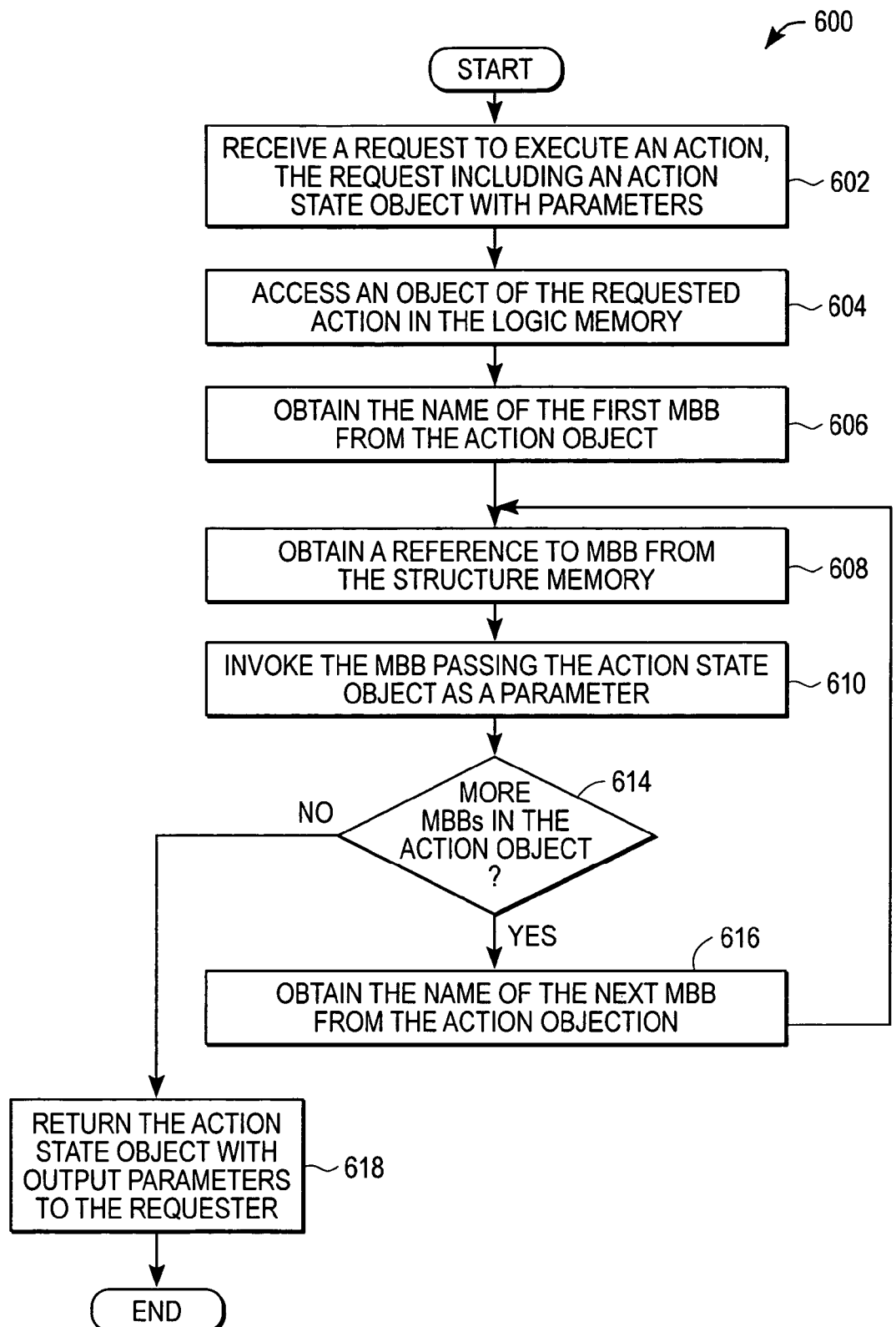
FIG. 6 is a flow diagram of one embodiment of a process for executing an interpreted action.

FIG. 6 is a flow diagram of one embodiment of a process for executing an interpreted action. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 600 is performed by a scheduler 254 of FIG. 2B.

Referring to FIG. 6, processing logic begins with receiving a request to execute an action (processing block 602). The request includes an action state object containing input parameters.

At processing block 604, processing logic accesses an object of the requested action in the logic memory using the action name as the key.

At processing block 606, processing logic obtains the name of the first MBB from the action object.

Next, processing logic obtains the reference to the first MBB from the structure memory using the MBB name as the key (processing block 608) and invokes this MBB, passing it the action state object as an input parameter (processing block 610).

Further, processing logic determines if there are more MBBs in the action object (processing box 614). If so, processing logic obtains the name of the next MBB from the action object (processing block 616) and returns to processing block 608. If not, processing logic returns the action state object with the output parameters to the requester (processing block 618).

Figure 7:
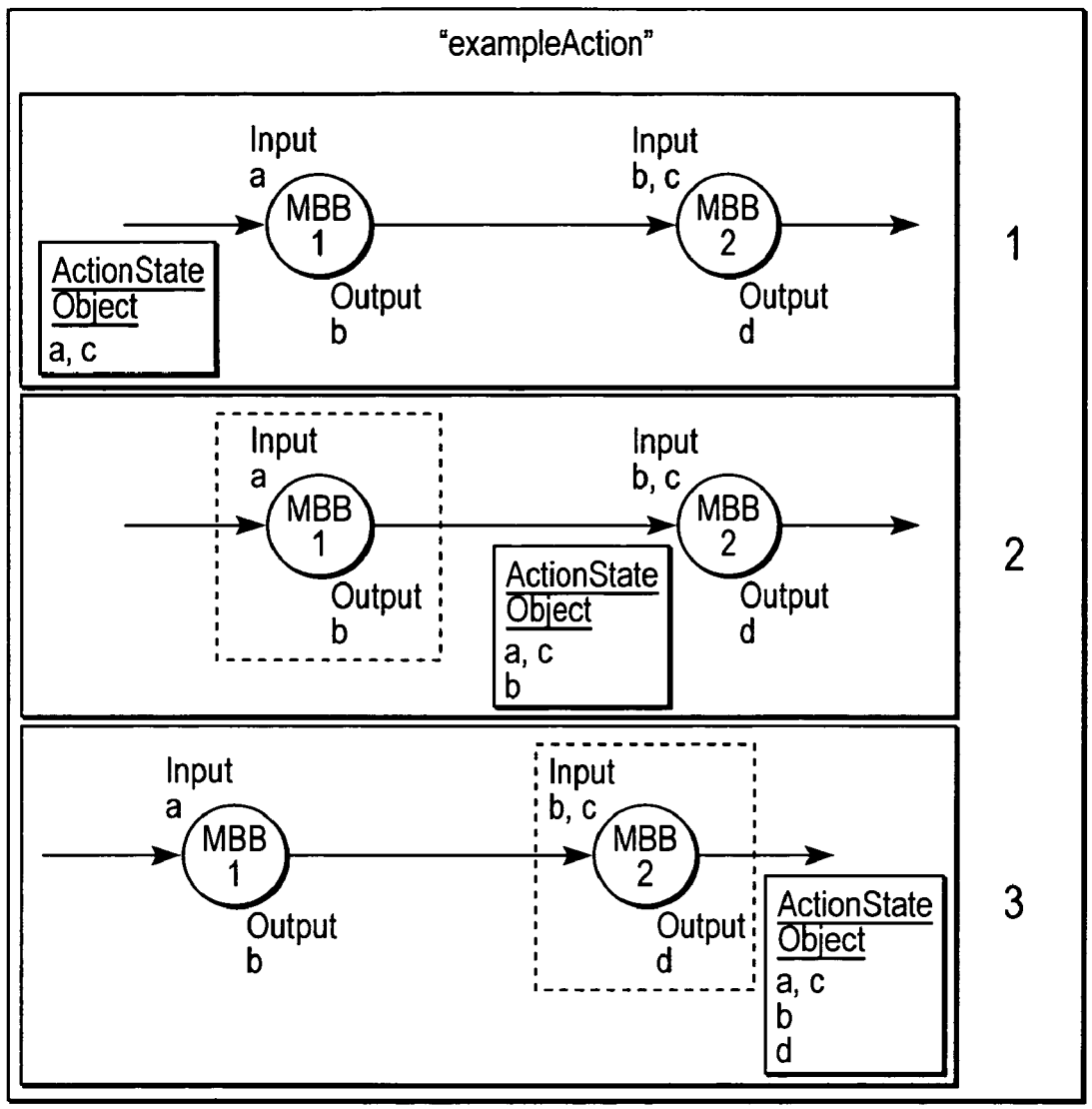
FIG. 7 illustrates an exemplary execution of an interpreted action.

FIG. 7 illustrates an exemplary execution of an interpreted action. The name of the action is "exampleAction" and it consists of two MBBs. To simplify the explanation, an action is assumed to have no conditional transitions or loops.

Referring to FIG. 7, the scheduler receives a request to execute an action called "exampleAction". The request includes an action state object that contains two parameters, a and c (Step 1). The scheduler uses the action name to access the logic memory and obtains a pointer to the action graph's first node. The scheduler obtains the name of the MBB from the action graph's node, and uses the name (MBB1) to resolve the MBB from the structure memory.

After resolving MBB1, the scheduler invokes the MBB passing the action state object. MBB1 requires an input parameter named a, which it obtains from the action state object. MBB1 executes its algorithm and generates an output parameter b, which it stores in the action state object (Step 2).

Next, the scheduler obtains the name of the next state from the current actions graph's node, obtains the name of the MBB (MBB2), and resolves MBB2 from the structure memory. The scheduler invokes MBB2 with the action state object as a parameter. MBB2 requires two parameters, b and c, which it obtains from the action state object. MBB2 executes its algorithm, generates an output parameter called d, and stores the parameter in the action state object (Step 3).

Finally, the scheduler returns the action state object to the requestor that can retrieve any output parameter generated during the execution of the action.

The action execution process described above can be used to detect safe software reconfiguration points automatically. Specifically, the software can be reconfigured only between MBB invocations. MBBs are allowed to access and modify the externalized structure, logic, and state. Therefore, modifying these parameters might affect the execution of the MBBs and could lead to an inconsistent software state. The software construction system waits until the MBB completes its execution to avoid undesirable results. This behavior applies to both interpreted and compiled actions. Compiled actions use a designated library to invoke MBBs and therefore give control to the system to implement reconfiguration.

Protocols

Figure 8A:
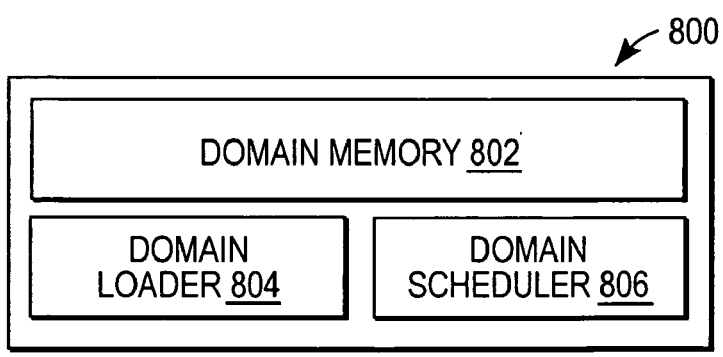
FIG. 8A is a block diagram of one embodiment of a domain.

As discussed above, some embodiments of the present invention use domains to support construction of software at run time. FIG. 8A is a block diagram of one embodiment of a domain 800.

Referring to FIG. 8A, the domain 800 includes three subcomponents: a domain memory 802, a domain loader 804 and a domain scheduler 806. The domain memory 802 is a tuple container that stores the name and reference of MBBs hosted by the entity, the MBBs' attributes, and a set of one or more actions.

The domain loader 804 is responsible for creating MBBs, deleting MBBs, providing a list of MBBs, loading actions, deleting actions, providing a list of actions, modifying actions, and parsing software structure descriptions, MBB description and software logic descriptions.

The domain scheduler 806 is responsible for parsing action definitions (e.g., actions' DFSA) and invoking MBB actions in the order specified by the action definition.

Figure 8B:
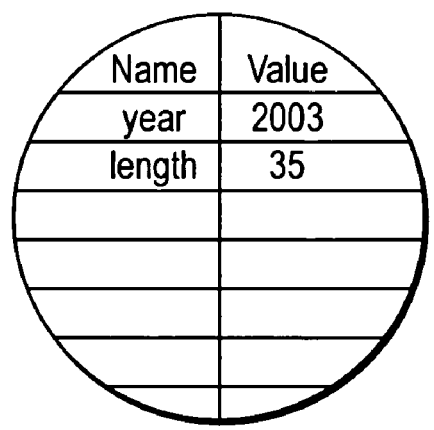
FIG. 8B illustrates an exemplary tuple container.

FIG. 8B illustrates an exemplary tuple container. A tuple container is a storage area where information is stored as name and value pairs. The tuple container provides functionality to store information tuples and to retrieve information tuples using the name as the search key.

In one embodiment, dynamic composition of software is achieved using a set of protocols. The set of protocols include a domain initialization protocol, an MBB creation protocol, an MBB deletion protocol, an MBB listing protocol, a software structure loading protocol, an action loading protocol, an action deletion protocol, an action listing protocol, an action modification protocol, a software logic parsing protocol, an MBB invocation protocol, a remote MBB invocation protocol, and an action invocation protocol.

Figure 9:
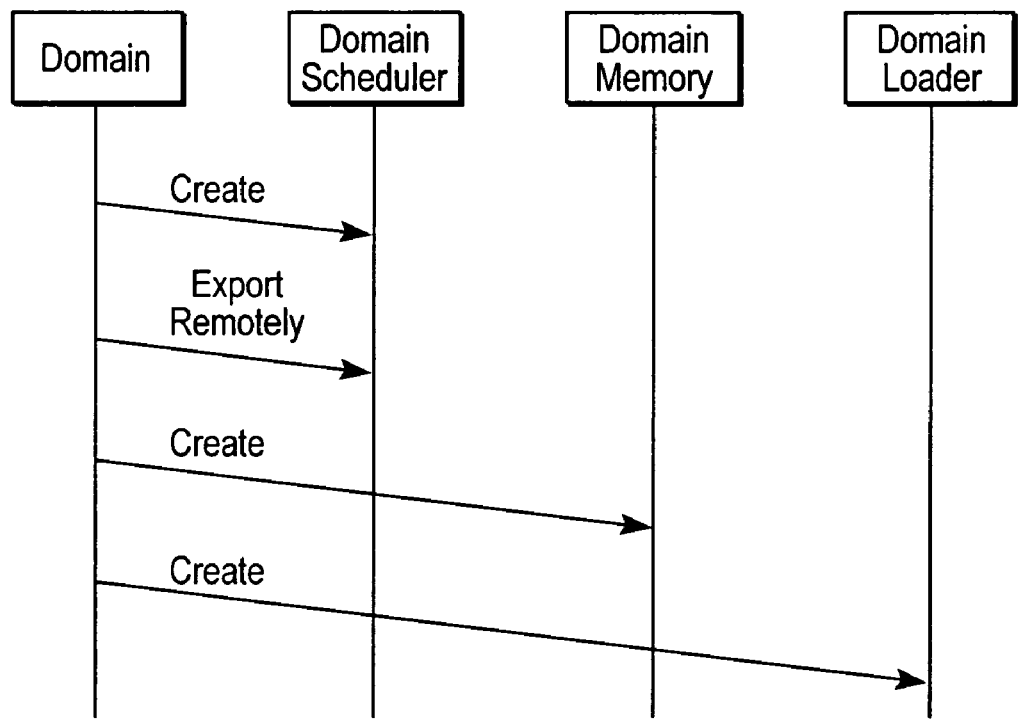
FIGS. 9–21 illustrate a set of protocols used in a domain.

FIG. 9 illustrates the domain initialization protocol. Referring to FIG. 9, when a domain object is created, the domain object instantiates a domain scheduler, a domain memory object (tuple container), and a domain loader object. Then, the domain object exports the domain scheduler as a remote object to allow an action to be invoked in the domain remotely.

Figure 10:
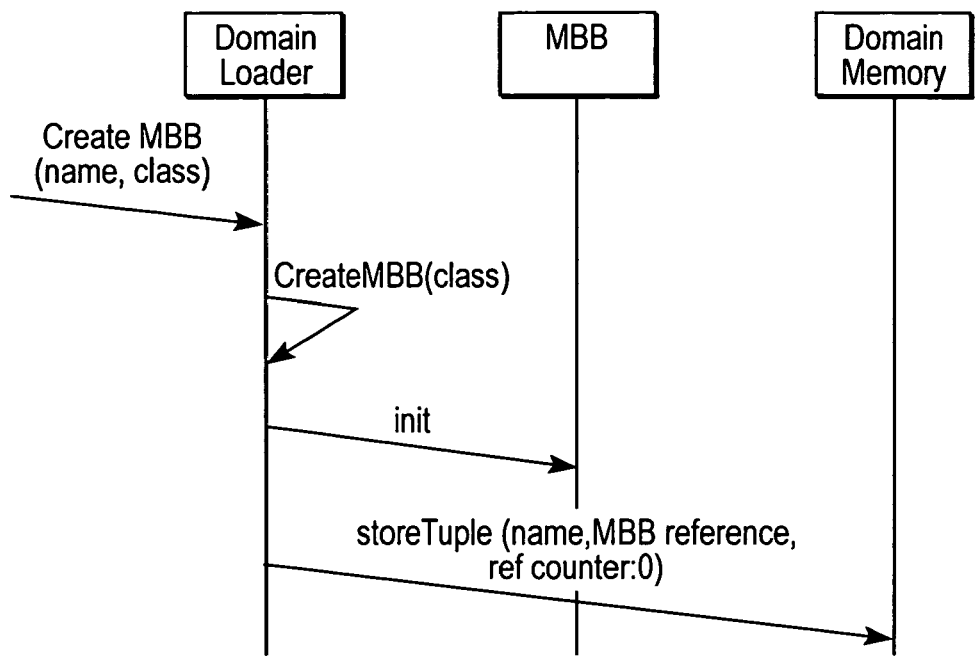

FIG. 10 illustrates the MBB creation protocol. Referring to FIG. 10, the domain loader implements the functionality to create and initialize micro building blocks. In one embodiment, the domain loader implements a method called CreateMBB that receives an MBB name and an MBB class name. The method instantiates an object of the specified class, initializes the MBB, and stores a tuple in the domain memory with the name of the MBB and the reference to the object. In addition, the CreateMBB method sets the reference counter value of the tuple to 0 to indicate that the MBB is not being used in any action.

Figure 11:
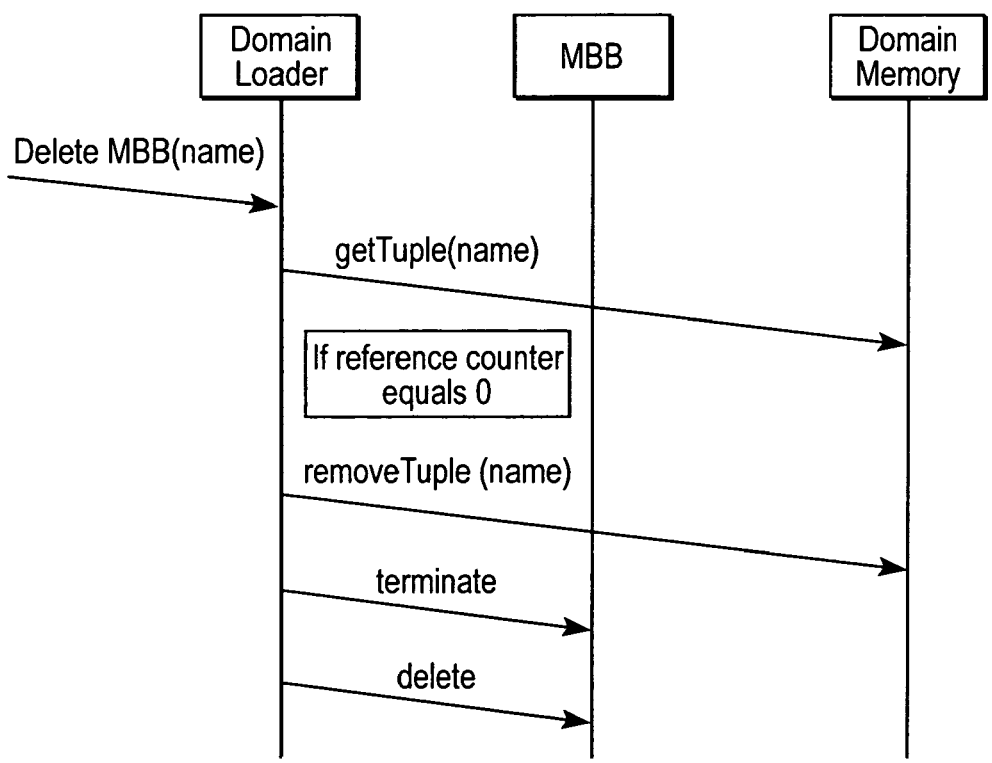

FIG. 11 illustrates the MBB deletion protocol. Referring to FIG. 11, the domain loader implements the functionality to delete micro building blocks. In one embodiment, the domain loader implements a method called DeleteMBB that receives an MBB name, checks the MBB reference counter, and deletes the MBB if the reference counter equals to 0. Otherwise, the domain loader returns an error message.

Figure 12:
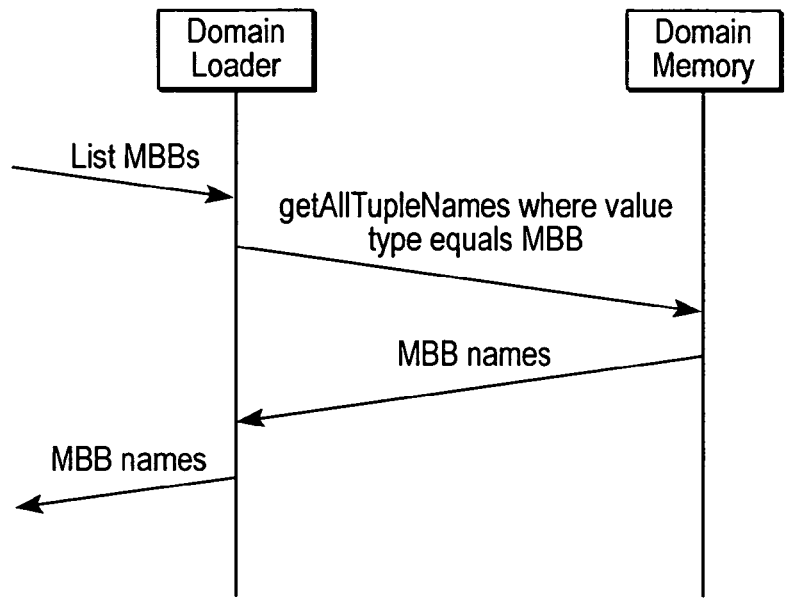

FIG. 12 illustrates the MBB listing protocol. Referring to FIG. 12, the domain loader implements the functionality to list micro building blocks. In one embodiment, the domain loader implements a method called ListMBBs that returns a list of all MBBs stored in the domain memory.

Figure 13:
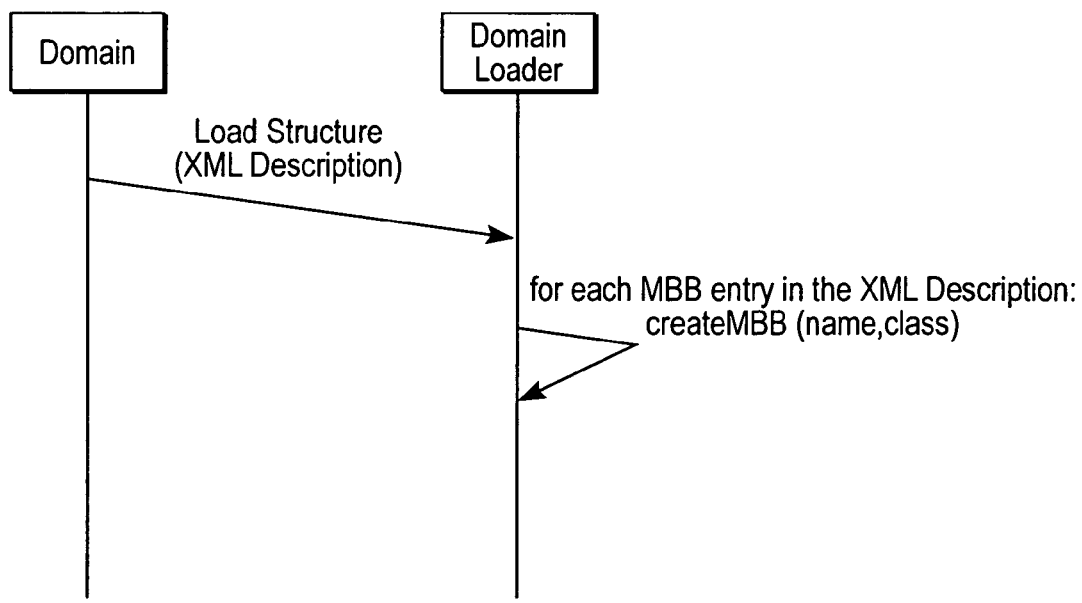

FIG. 13 illustrates the software structure loading protocol. Referring to FIG. 13, loading the software structure implies creating and initializing all the micro building blocks required for the specified software. In one embodiment, the protocol starts when the domain loader receives a software structure description and a request to load it. The domain loader parses the description and creates one MBB for each entry in the description. To create the MBBs, the domain loader leverages the MBB creation protocol.

Figure 14:
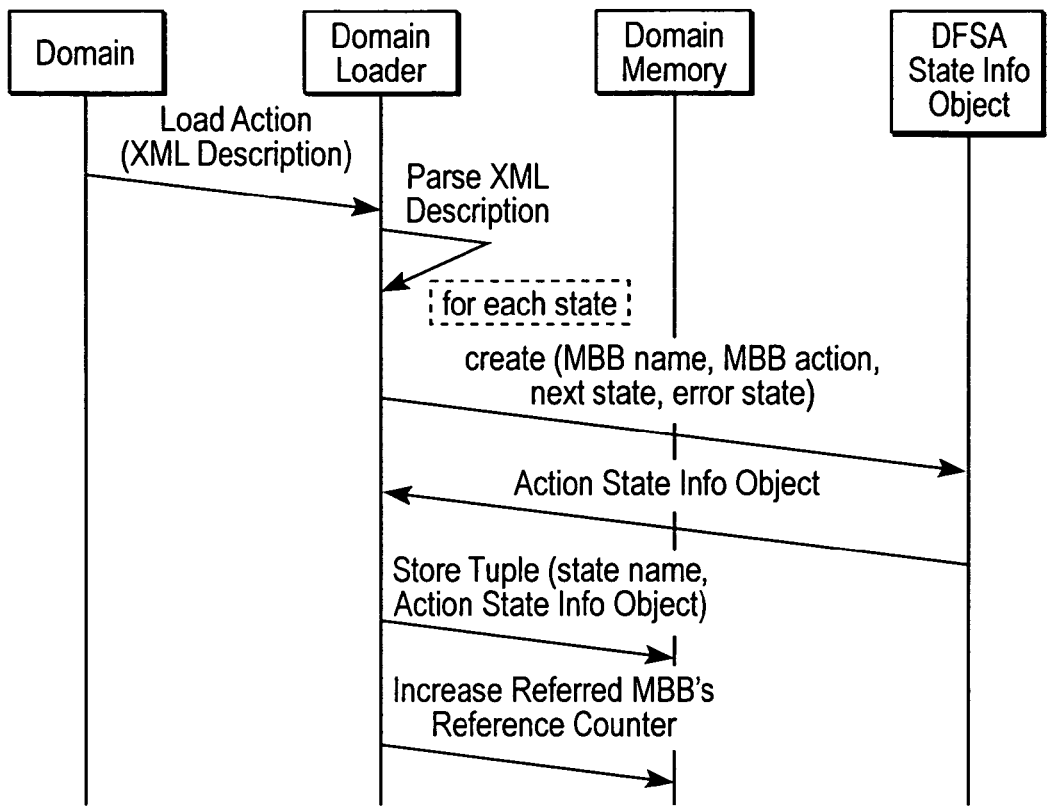

FIG. 14 illustrates the software action loading protocol. Referring to FIG. 14, the domain loader implements the protocol to load software actions. In one embodiment, the domain loader parses a software logic description, and for each state contained in the description, creates an action state info object and stores in the domain memory a tuple containing the name of the state and the reference to the action state object. In addition, the domain loader increases the MBB's reference counter for each MBB referred in the state.

Figure 15:
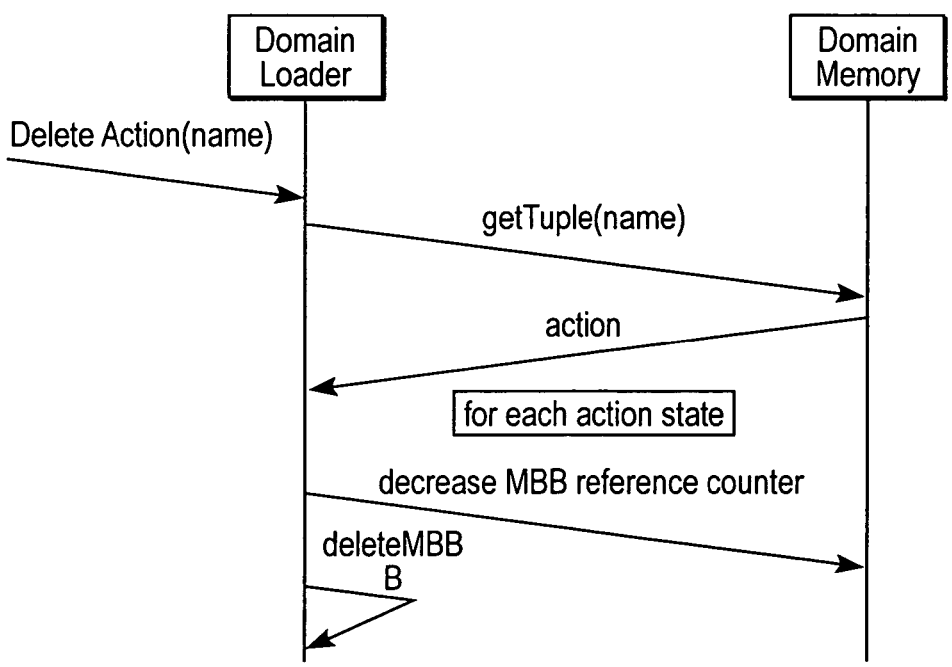

FIG. 15 illustrates the action deletion protocol. Referring to FIG. 15, the domain loader implements the functionality to delete actions. In one embodiment, the domain loader implements a method called DeleteAction that receives the name of the action, retrieves the action from the domain memory, and for each MBB involved, decreases the reference counter and deletes the MBB.

Figure 16:
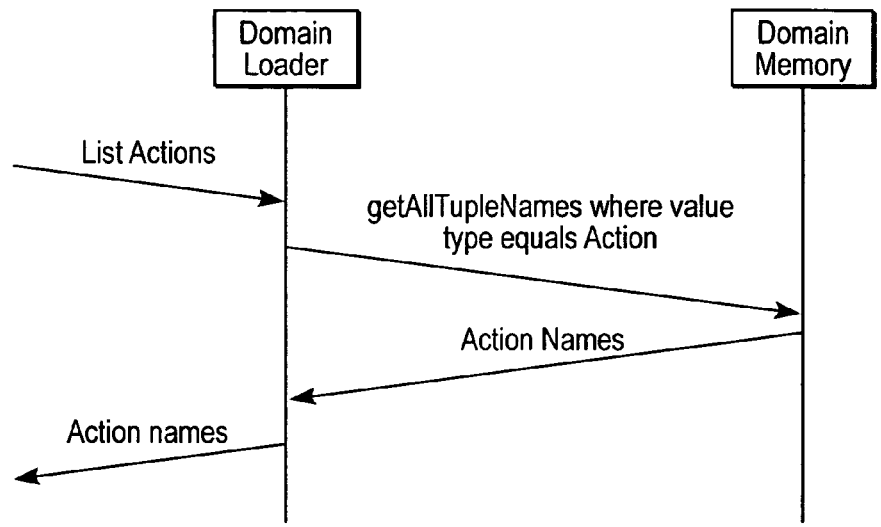

FIG. 16 illustrates the action listing protocol. Referring to FIG. 16, the domain loader implements the functionality to list actions. In one embodiment, the domain loader implements a method called ListActions that returns a list of all actions stored in the domain memory.

Figure 17:
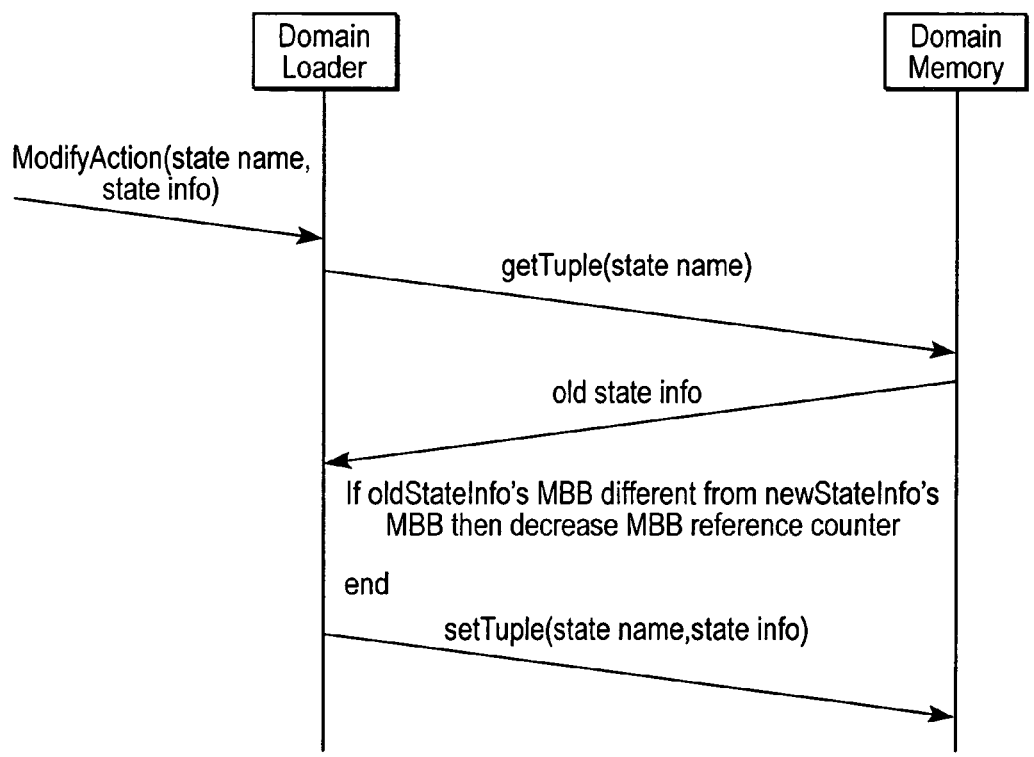

FIG. 17 illustrates the action modification protocol. Referring to FIG. 17, the domain loader implements the functionality to modify actions. In one embodiment, the domain loader implements a method called ModifyAction that receives the name of an action state and an object containing the new state. The method retrieves the action state from the domain memory, compares the names of the MBBs of the existing and new states and in case of being different decreases the MBB reference counter. The method also replaces the state information with the new one.

Figure 18:
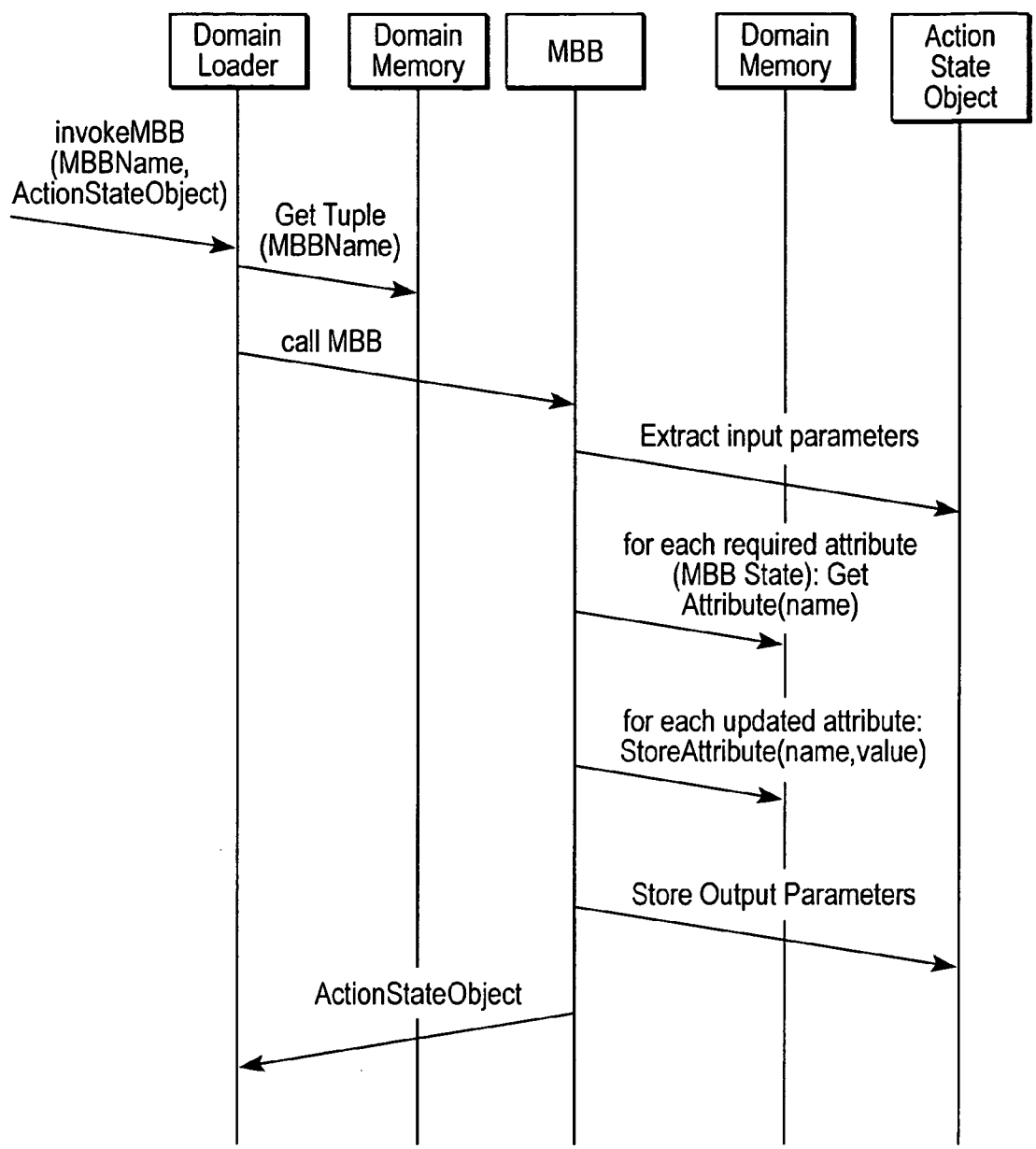

FIG. 18 illustrates the local MBB invocation protocol. Referring to FIG. 18, the protocol specifies how to invoke a local MBB, i.e., an MBB contained in the same domain as the domain scheduler. In one embodiment, the protocol starts with the invokeMBB method, which requires two parameters: the name of an MBB and an Action State Object. The domain loader uses the name of the MBB to retrieve from the domain memory a tuple that contains the reference to the MBB. Next, the domain loader invokes the MBB and extracts required parameters from the action state object, and the attributes that correspond to the state from the domain memory. Then, after executing the action, the MBB updates the domain memory with all the attributes it has modified, stores the output parameters in the action state object, and returns the action state object to the domain loader.

Figure 19:
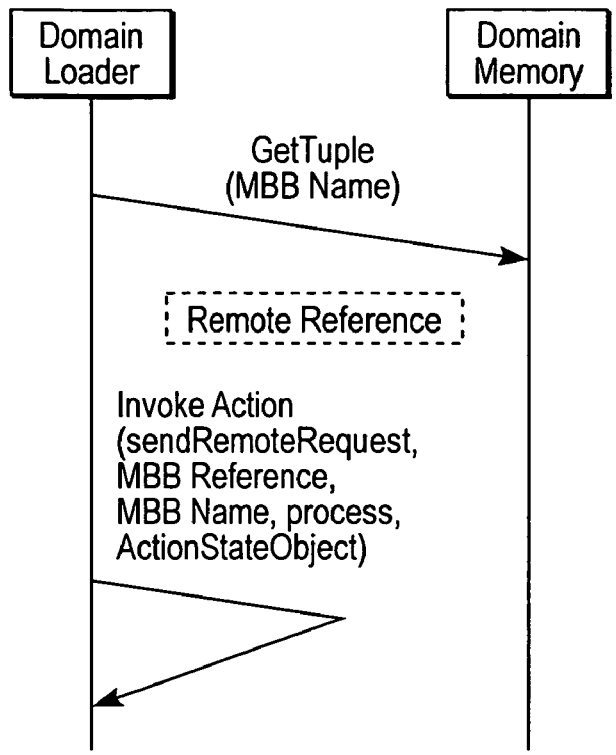

FIG. 19 illustrates the remote MBB invocation protocol. Referring to FIG. 19, the protocol provides support to invoke MBBs that reside in remote domains. This functionality simplifies migration of MBBs without affecting the execution of actions. In one embodiment, the domain scheduler automatically detects whether the MBB is local or remote and uses the appropriate protocol. In one embodiment, the protocol begins with the domain loader receiving a request to invoke an action on an MBB. The request includes two parameters, the name of the MBB and the action state object. The domain loader resolves the MBB name from the domain memory. The result is a reference to a remote MBB. The domain loader invokes an action to issue a remote procedure call. A collection of actions is provided to send and receive requests. These actions and their associated MBBs are loaded by default. The action is called SendRemoteRequest and requires the reference of the MBB, the name, the method for remote invocation, and the action state object. The action issues a remote request and receives an updated action state object.

Figure 20:
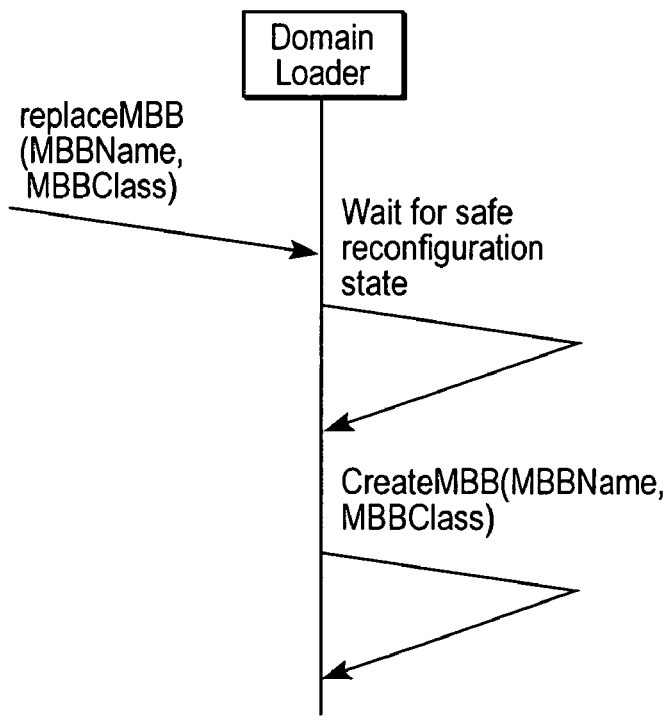

FIG. 20 illustrates the MBB replacement protocol. Referring to FIG. 20, the protocol allows replacing an existing MBB with a new MBB, without stopping the running system. In one embodiment, the protocol starts with the command to replace an MBB, waits for a safe reconfiguration state, and creates a new MBB that has the same tuple name but a different implementation class.

Figure 21:
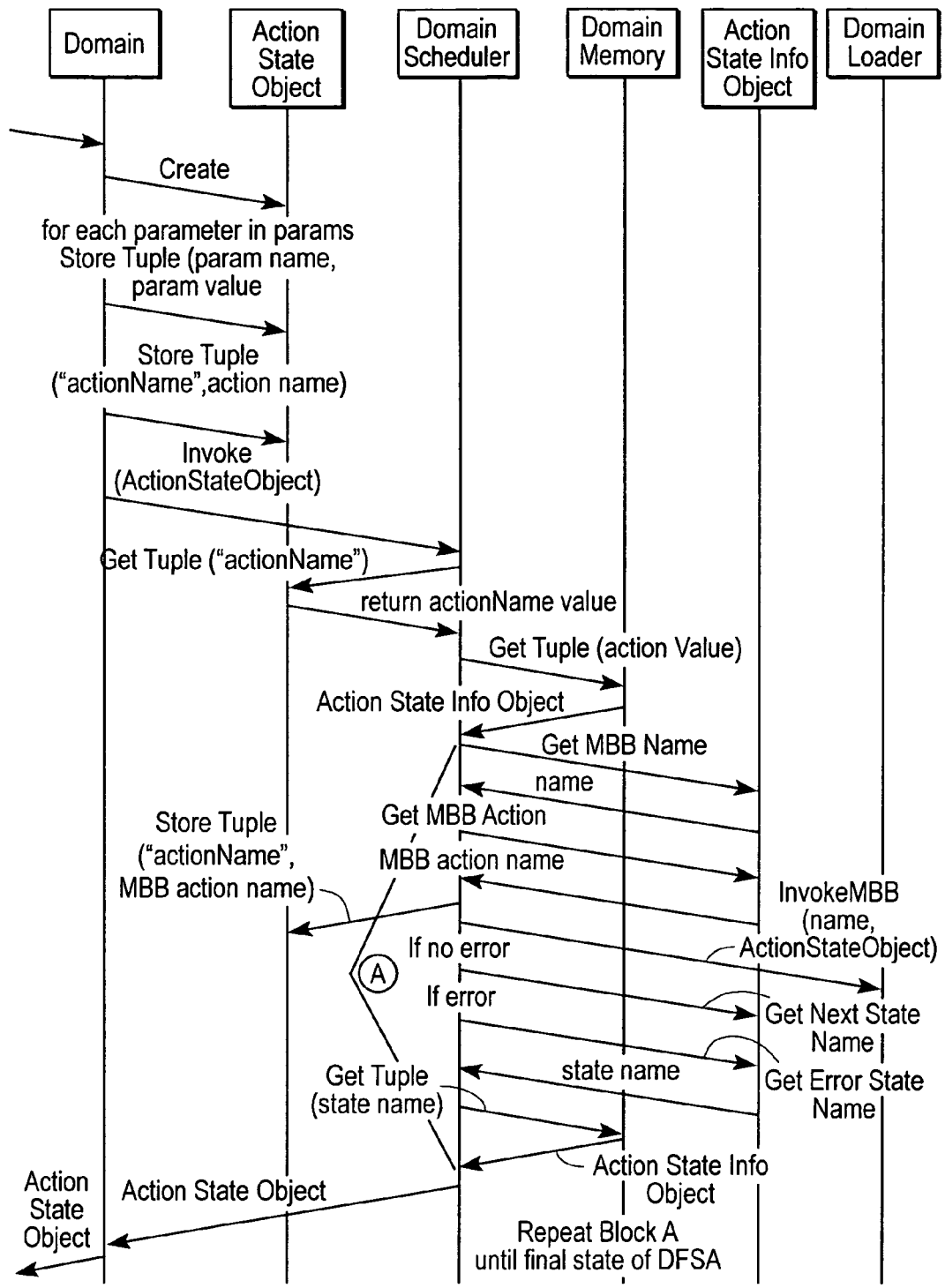

FIG. 21 illustrates the action invocation protocol. Referring to FIG. 21, the action invocation protocol defines all the steps required to execute an action, including parsing the DFSA and invoking the affected MBBs. In one embodiment, the domain object exports a method (invokeAction) that implements the action invocation protocol. The method receives the action name and the parameters as a collection of name and value tuples. The domain object creates an action state object and stores the parameter tuples and a tuple named actionName with the name of the action. Next, the invokeAction method invokes the process method on the domain scheduler, passing the action state object. The domain scheduler resolves the actionName tuple from the action state object and uses the value to resolve the first DFSA state info object. The domain scheduler retrieves the name of the MBB associated to the DFSA state and the name of the action to invoke on the MBB. Next, the domain scheduler stores the MBB action name in the action state object and invokes the domain loader's invokeMBB protocol. When the MBB invocation protocol finalizes, the domain scheduler retrieves the next action state name from the action state info object (in case of error condition, it retrieves the next error state), uses the name to resolve the associated action state info object, and repeats all the steps contained in block A. The protocol keeps invoking MBBs until reaching the final action state. At this point, the domain scheduler returns the updated action state object to the domain object that returns it to the requestor.

Converting a Program into Reconfigurable Software

In some embodiments, existing programs that were created using conventional methods can be converted into software that may subsequently be reconfigured, updated or upgraded as discussed above. In one embodiment, conversion is applicable to a program that can be defined as a set of one or more tasks, with task consisting of a collection of objects (e.g., Java objects), and having a set of interaction rules among the objects that define invocation order and the task state that is the union of all the objects' public attributes.

Figure 22:
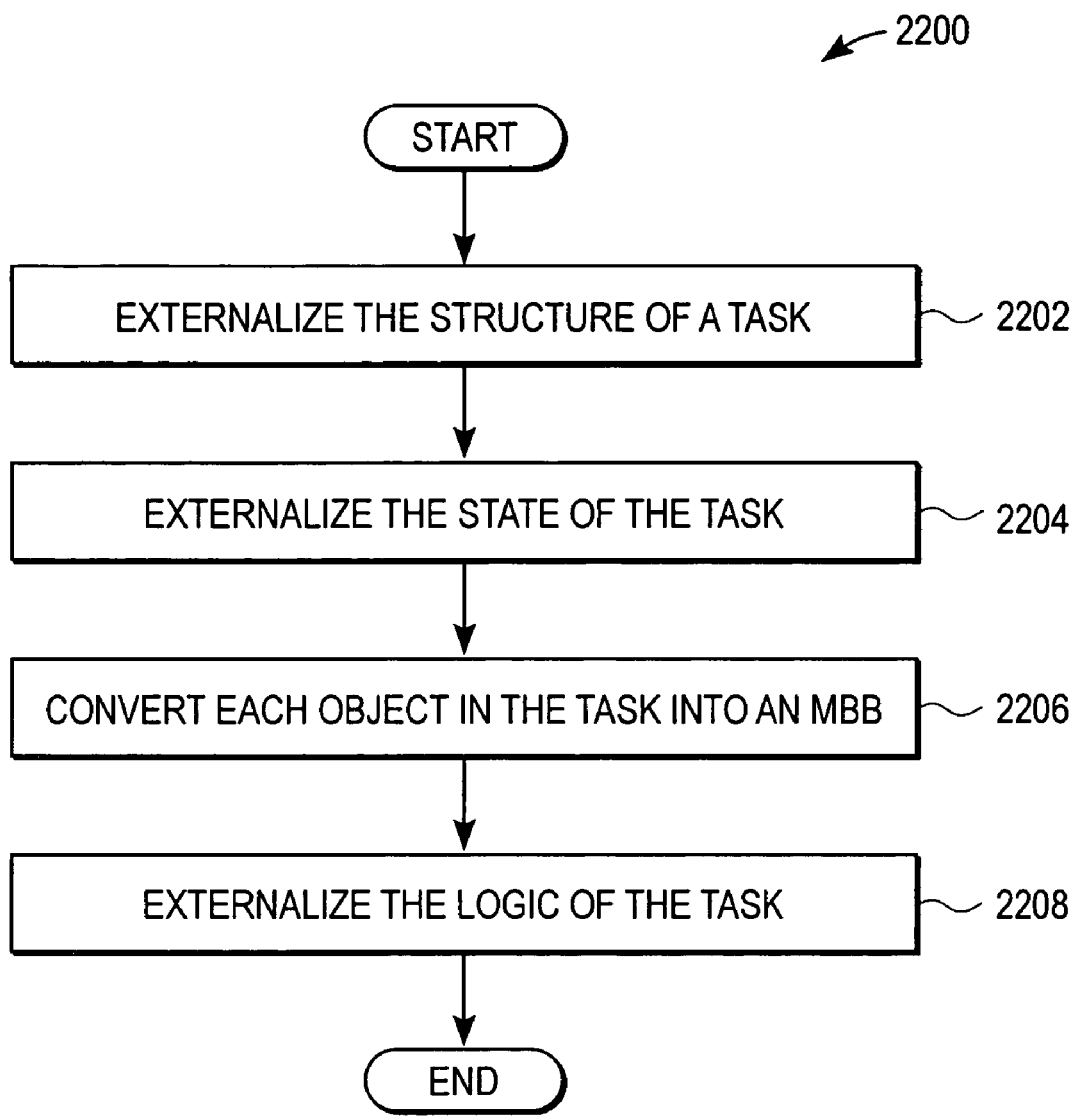
FIGS. 22–24 are flow diagrams of one embodiment of a process for converting a program into reconfigurable software.
Figure 23A:
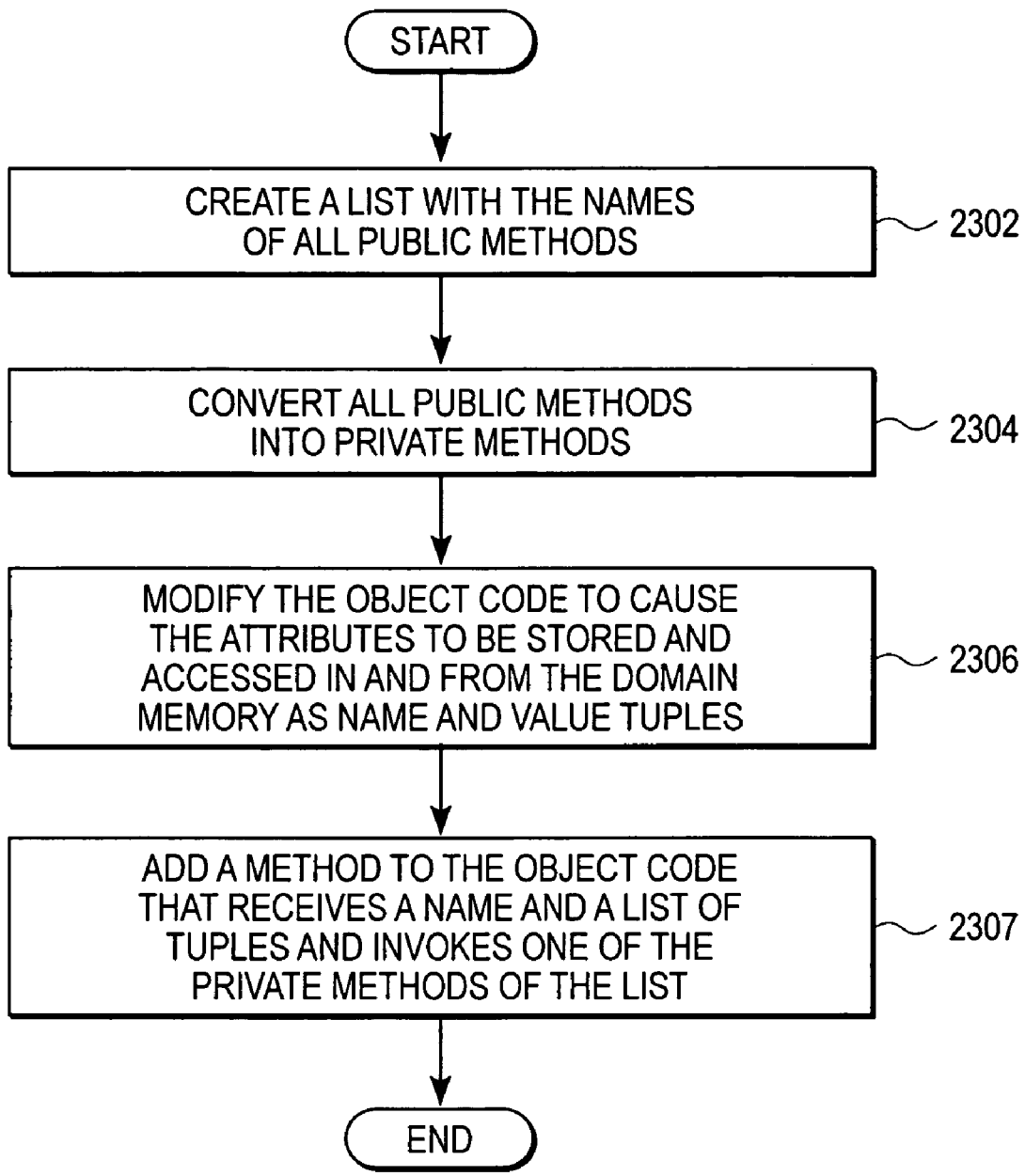
Figure 23B:
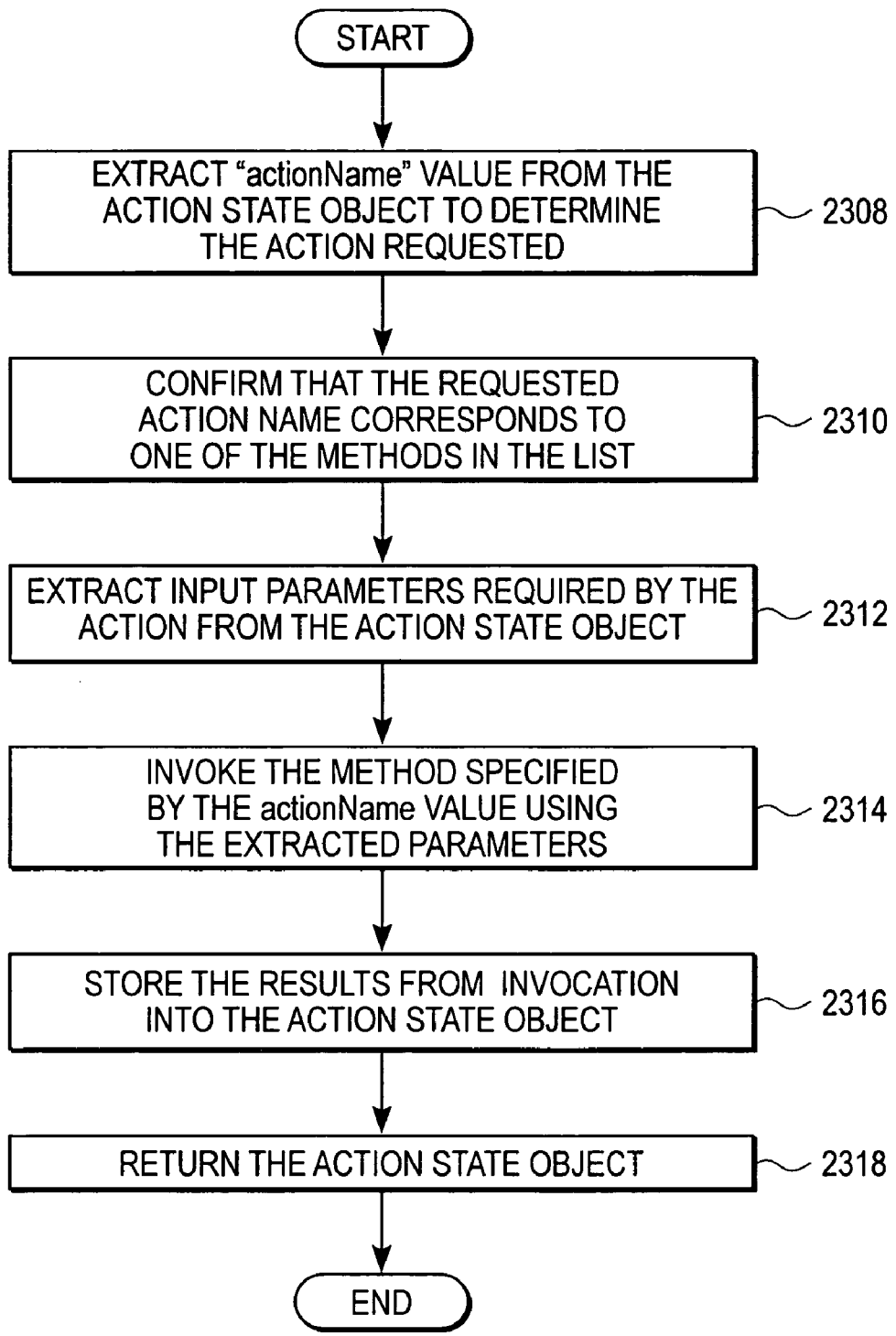
Figure 24:
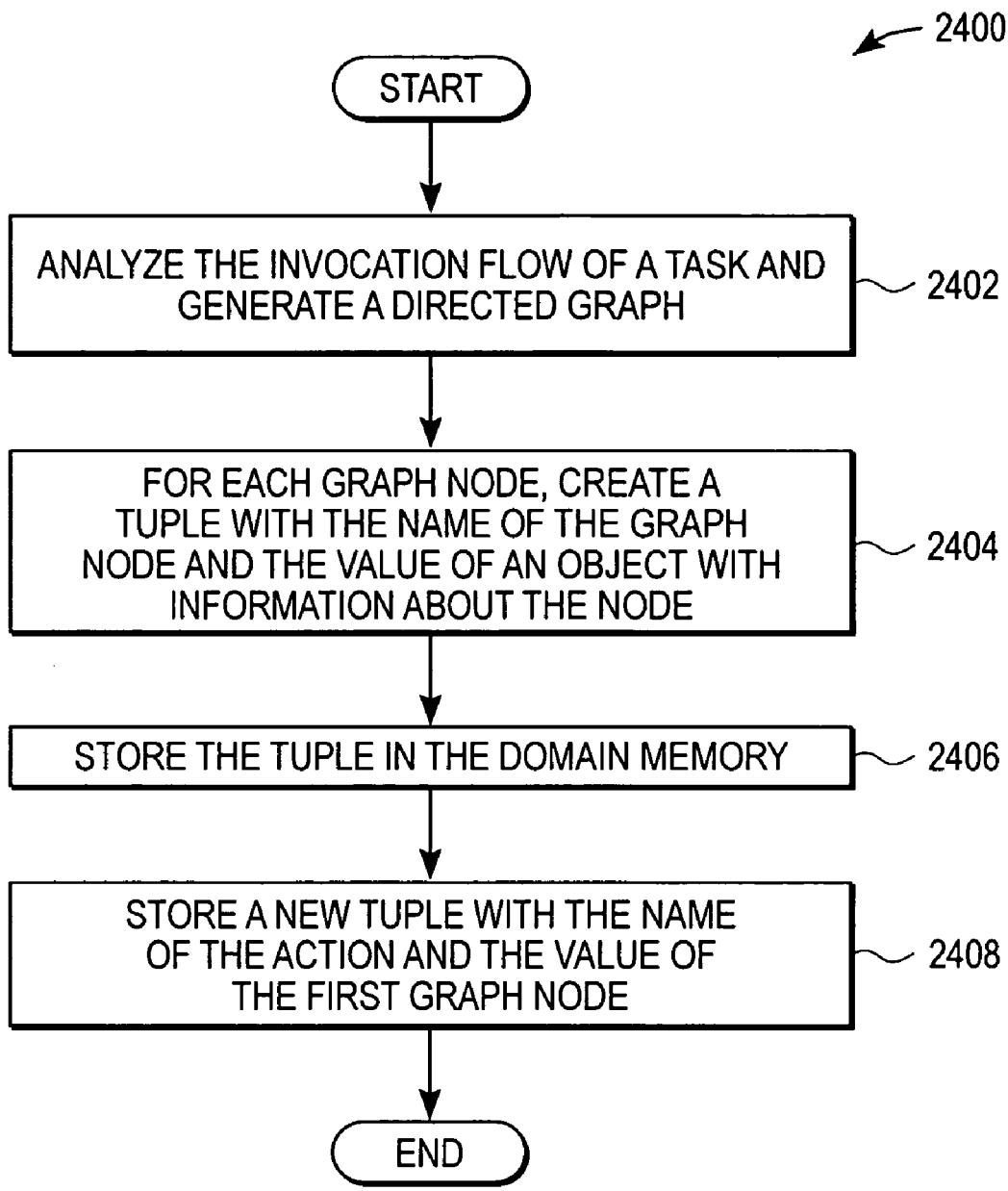

FIGS. 22–24 are flow diagrams of one embodiment of a process 2200 for converting a program into reconfigurable software. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 2200 is performed by a software construction system 108 of FIG. 1.

Referring to FIG. 22, processing logic begins with externalizing the structure of the task (processing block 2202). In one embodiment, processing logic externalizes the structure of the task by (a) creating, for each task and each object that belongs to the task, a tuple with the name of the object and the reference to the object, (b) storing each created tuple in the domain memory, (c) creating a tuple named softwareArchitecture whose value is a list with the names of all the objects that belong to program P, and (d) storing the tuple softwareArchitecture in the domain memory.

At processing block 2204, processing logic externalizes the state of the task. In one embodiment, processing logic externalizes the state by (a) creating, for each object in the task and each public attribute in the object, a tuple where the name of the tuple is the name of the attribute, and the value is a reference to the value of the variable, and (b) storing each created tuple in the domain memory.

At processing block 2206, processing logic converts each object in the task into an MBB. One embodiment of a process for converting an object in a task into an MEB will be discussed in more detail below in conjunction with FIG. 23A.

FIG. 23A is a flow diagram of one embodiment of a process for converting an object in a task into an MBB.

Referring to FIG. 23A, processing logic begins with creating a list with the names of all public methods associated with the object (processing block 2302). A public method is a function that can be invoked from outside the object (e.g., by a client).

At processing block 2304, processing logic converts all public methods into private methods. A private method is a function that can be invoked internally (e.g., by another method of the object).

At processing block 2306, processing logic modifies the object code to cause the attributes to be stored and accessed in and from the domain memory as name and value tuples.

At processing block 2307, processing logic adds a method to the object code that receives a name and a list of tuples and invokes one of the private methods from the list of private methods.

FIG. 23B is a flow diagram of one embodiment of a process for invoking an MBB.

Referring to FIG. 23B, processing logic begins with extracting the actionName value from an action state object to determine which action is requested by the client (processing block 2307). An action state object stores a collection of input and output parameters required and generated during the execution of an action. In one embodiment, the input and output parameters are stored as tuples.

At processing block 2310, processing logic verifies that the name of the requested action corresponds to one of the methods stored in the list of public methods. Otherwise, processing logic raises an exception.

At processing block 2312, processing logic extracts the input parameters required by the action from the action state object.

At processing block 2314, processing logic invokes the method specified by the actionName value using the extracted parameters.

Next, processing logic stores the results from the invocation into the action state object (processing block 2316) and returns the action state object (processing block 2318).

FIG. 24 is a flow diagram of one embodiment of a process for externalizing the logic of a task.

Referring to FIG. 24, processing logic begins with analyzing the invocation flow of a task and generating a directed graph, where the name of the node corresponds to the invocation number (processing block 2402).

At processing block 2404, processing logic begins generating a DFSA from the directed graph by creating, for each graph node, a tuple whose name is the name of the graph node and whose value is an object storing the information about the node.

At processing block 2406, processing logic stores the above tuple in the domain memory.

At processing block 2408, processing logic stores an additional tuple whose name is the name of the action and the value is a string with the first graph node.

Index-Based Parameter Access

As set forth in FIG. 3A, in one embodiment, MBB infrastructure uses a hash table to store and access information. This is convenient for developers because they can access parameters directly by name. In an alternative embodiment, the hash tables are replaced with pointer arrays that are accessed by index. Thus, the Micro Building Blocks (MBBs) use index-based parameter access techniques to enable access to various parameters.

Figure 25:
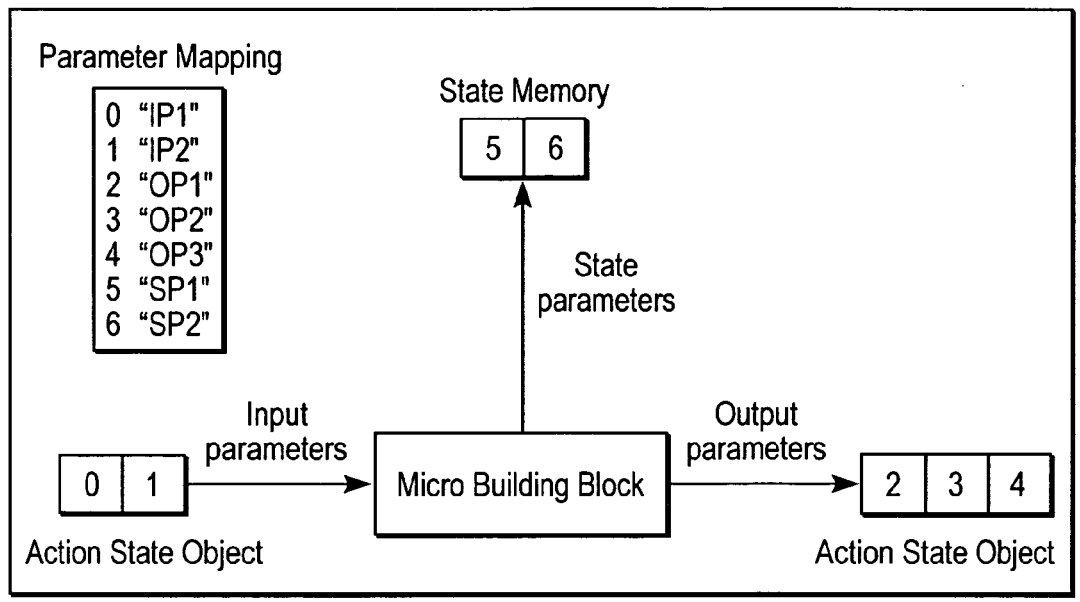
FIG. 25 illustrates the parameter access.

FIG. 25 illustrates the parameter access techniques set forth herein. The techniques reduce the time required to access input, output, and state parameters by replacing the hash table described above with an integer indexed array and a collection of dynamically generated indices. In one embodiment, an infrastructure uses the MBB and structure XML description files to generate the indices automatically, maintains a mapping between the parameter names and their associated indices, and exports functionality to assign the indices' values to the MBBs during their initialization.

Figure 26:
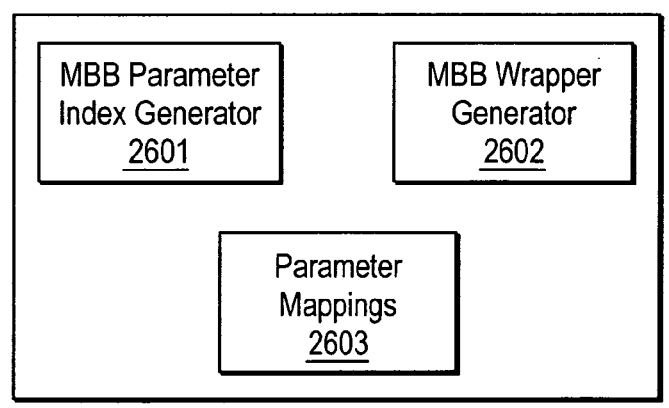
FIG. 26 is a block diagram of one embodiment of a set of building blocks that implement the optimization functionality.

FIG. 26 is a block diagram of one embodiment of a set of building blocks that implement the optimization functionality. Referring to FIG. 26, MBB parameter index generator 2601 parses an MBB XML description file and generates unique indices that are associated with the parameters. In one embodiment, there is an index for each input, output, and state object.

In one embodiment, the indices are numeric indices. The numeric indices allow direct access to objects stored in memory. MBB wrapper generator 2602 parses an MBB XML description and generates an MBB code template with a list of constants that represent the parameters, a method to initialize the constant values, and one or more empty methods for the actions implemented by the MBB that developers fill in.

In one embodiment, MBB wrapper generator 2602 uses an XML parser to perform the parsing. This parser opens the file, reads the contents, analyzes the different keywords contained in the file, and extracts the information about the MBB. The parser uses this information to generate the code automatically.

In one embodiment, the represented methods include the following:

1) a constant initialization method that includes code to assign a value to the constants associated to the MBB. The MBB infrastructure invokes this method automatically when loading the MBB for the first time.

2) MBB methods that export the MBB's functionality. In one embodiment, these methods are defined in the original XML file by the user and are the ones the infrastructure invokes to provide the specified functionality.

Parameter mappings 2603 is a hash table that stores a list of parameters and their associated indices. The parameter mappings 2603 (that is, name to index association) stores the parameter mappings so the system can refer to them later. Although there are many ways of saving these mappings, for example, a linked list, a static array, etc., a hash table is used in one embodiment because of its speed in retrieving the information faster in comparison to other data structures. In one embodiment, parameter mappings 2603 are stored in the state memory.

Figure 27:
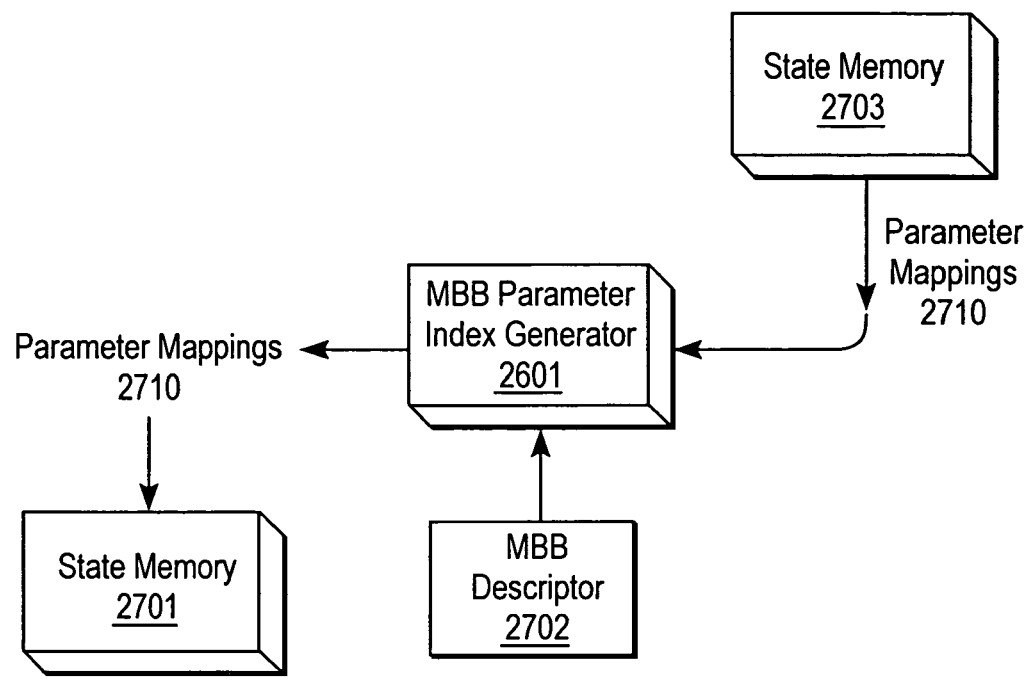
FIG. 27 illustrates data flow for one embodiment of a parameter index generator.

MBB parameter index generator 2601 is responsible for the management of parameter indices. According to FIG. 27, parameter index generator 2601 receives the parameter mappings 2710 (stored in state memory 2703) and MBB XML description file 2702, updates parameter mappings 2710, and stores the mappings in state memory 2701. In one embodiment, parameter index generator 2601 provides two functions: add parameter and remove parameter. The add parameter function generates a new index for a parameter (input, output, or state), while the remove parameter function eliminates a parameter and updates the associated index based on the number of MBBs using the parameter.

The use of indices increases the performance, but requires programmers to use these indices to access the parameters. To simplify parameter access, in one embodiment, MBB wrapper generator 2602 generates a list of parameter constants that match the name of the original parameters. Furthermore, wrapper generator 2602 creates a method that automatically initializes the values of the constants with the indices during the MBB initialization.

In one embodiment, the wrapper generator creates a method by generating a new file that contains code with the definition of the method. This code may be generated automatically.

Figure 28:
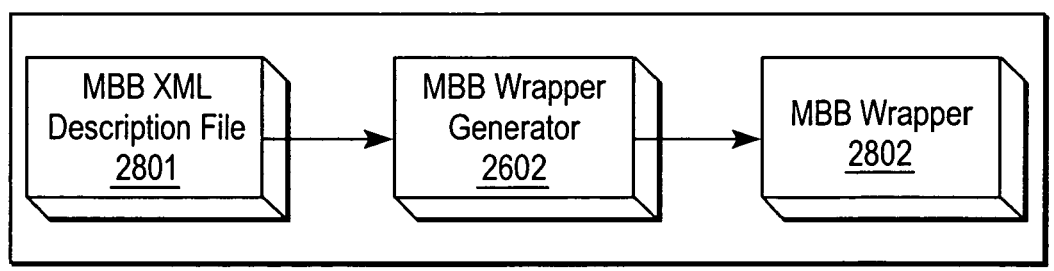
FIG. 28 illustrates one embodiment of a wrapper generator.

FIG. 28 illustrates one embodiment of MBB wrapper generator 2602. Referring to FIG. 28, MBB wrapper generator 2602 receives an MBB XML description file 2801 and generates MBB wrapper 2802 in a specific language. FIG. 29 depicts an example of a Java MBB wrapper.

In one embodiment, MBBs use three different types of parameters: input, output, and state. Input parameters are passed to the MBB when it is invoked, while the output parameters are generated by the MBB. The MBB scheduler receives these output parameters and passes them to any MBBs that follow. Finally, state parameters store the internal values of the MBB. These state parameters are stored in the state memory and are kept as long as the MBB is present in the system. In one embodiment, these three types of parameters are stored as key-value tuples. Instead of using names for the keys, indices are used. Unlike names, where the user simply writes a string corresponding to the parameter, with the indices, the user obtains the index before being able to use it to retrieve the value. To simplify this task, the wrapper generator automatically creates a variable for each of the parameters. The name of the variable corresponds to the name of the parameter. In one embodiment, the variable's type is integer, and it stores the value of the index associated to the parameter. The wrapper generator creates a method that automatically initializes the values of these parameters. FIG. 30 presents an example MBB XML description file. The MBB class is "example", and it has one state parameter (state 1), one input parameter (input1), and one output parameter (output 1). FIG. 29 illustrates the MBB wrapper produced by MBB wrapper generator 2602 after parsing the XML file. The result is a Java class with three internal attributes: state1, input1, and output1. These three integers are initialized during the creation of the MBB by the initIndices method, which obtains the parameter mappings hash table, resolves the three parameters by name, obtains the index value, and assigns it to the attributes of the MBB wrapper class. The integer attributes may be used to index the parameter arrays.

FIG. 31 depicts some example code that accesses the three parameters. Referring to FIG. 31, automatically generated variables, namely state1, input1, and output1, are used to index an array and obtain the appropriate values. In the code example, the user utilizes these variables to retrieve the appropriate value. For example, in line 3, we retrieve the input parameter value using the following: InputParams.getParameter(input1). Each of these variables (input1, output1, and state1) stores the index to the real parameter. The same applies to the output and state parameters.

In one embodiment, the parameter mappings object is a hash table that stores parameter mapping items. FIG. 32 is an example of a parameter mapping item. A parameter mapping item is a structure with two fields: parameter index and parameter references. The parameter index stores an integer that represents the numeric index associated to the parameter. The parameter reference is a counter that stores the number of MBBs referring to the parameter. That is, a parameter "x" could be listed as an input parameter in MBB "A" and MBB "B", and output parameter in MBB "C". In one embodiment, the system keeps the number of references to decide when it is safe to delete a parameter from the mappings' list.

Figure 33A:
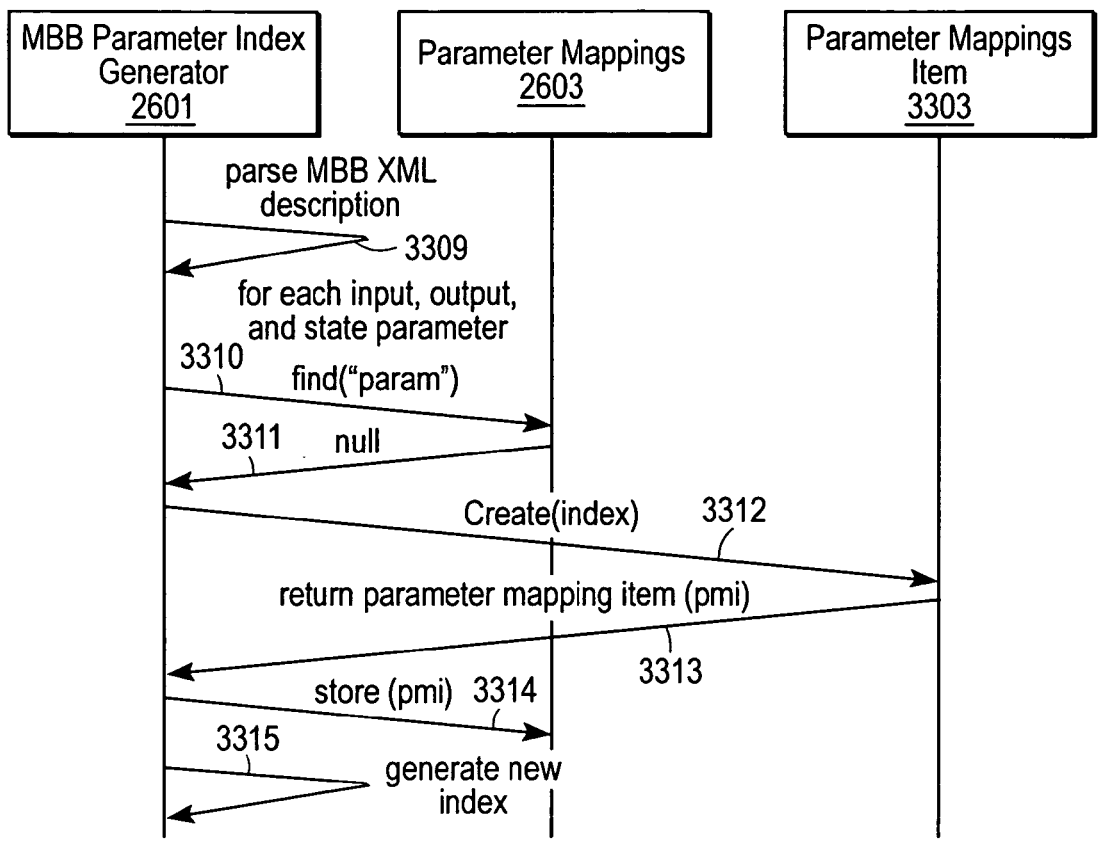
FIG. 33A and 33B is a flow diagram of one embodiment of a protocol to register a new parameter and obtain an index.
Figure 33B:
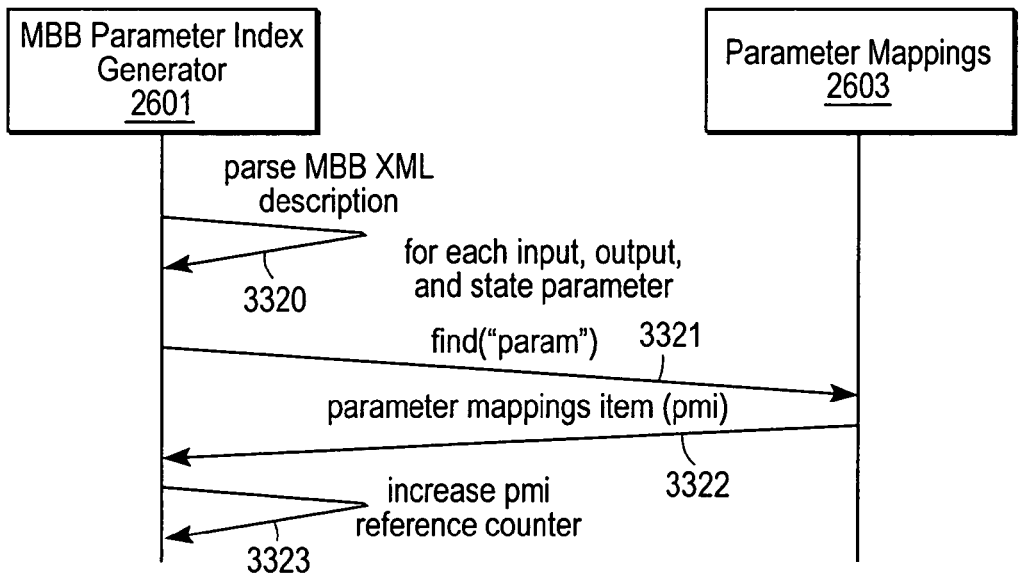

Exemplary Protocols and Parameter Wrapper Generation for Supporting Index-Based Parameter Access FIGS. 33A and 33B represent a flow diagram of one embodiment of a protocol to register a new parameter and obtain an index. FIG. 33A illustrates the scenario when the parameter does not exist, while FIG. 33B illustrates the scenario where the parameter already exists.

Referring to FIG. 33A, the MBB parameter index generator 2601 parses the MBB XML description (3309), and for every input, output, and state parameters, it looks in parameter mappings 2603 (3310). If the parameter does not exist (3311), MBB parameter index generator 2601 creates a new parameter mapping item (3312), assigns it a new index (3313), and stores it in parameter mappings 2603 (3314). Lastly, MBB parameter index generator 2601 generates a new index value (3315).

Referring to FIG. 33B, MBB parameter index generator 2601 parses the MBB XML description (3320), and for every input, output, and state parameter, MBB parameter index generator 2601 looks in parameter mapping 2603. If the parameter exists (3322), MBB parameter index generator 2601 increases the reference counter stored in the parameter mapping item (3323).

Figure 34:
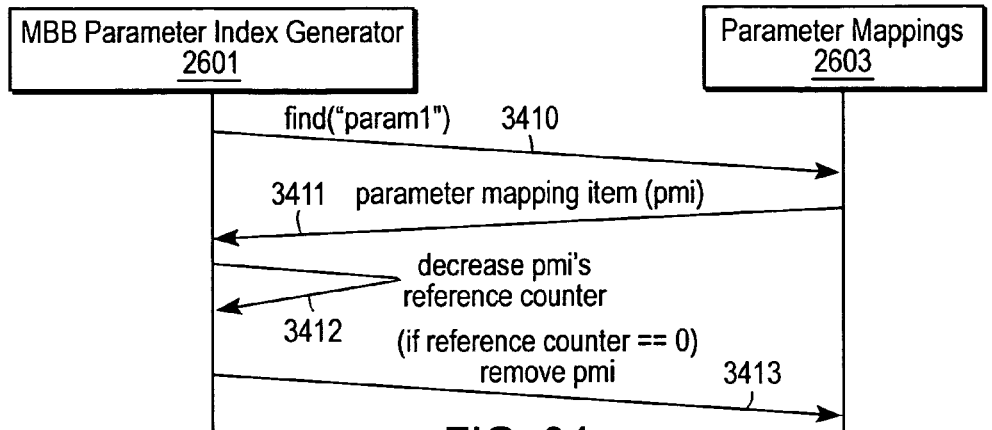
FIG. 34 is a flow diagram of one embodiment of a parameter removal protocol.

FIG. 34 is a flow diagram of one embodiment of a parameter removal protocol. Referring to FIG. 34, MBB parameter index generator 2601 begins by looking to parameter mapping 2602 and obtaining the parameter mapping item from parameter mappings (3311). Then, MBB parameter index generator 2601 decreases the reference counter stored in the parameter mapping item (3312). If the counter value reaches 0, MBB parameter index generator 2601 removes the item from the mappings (3313); otherwise, MBB parameter index generator 2601 leaves it in the mappings because it is used by some other MBB.

Figure 35:
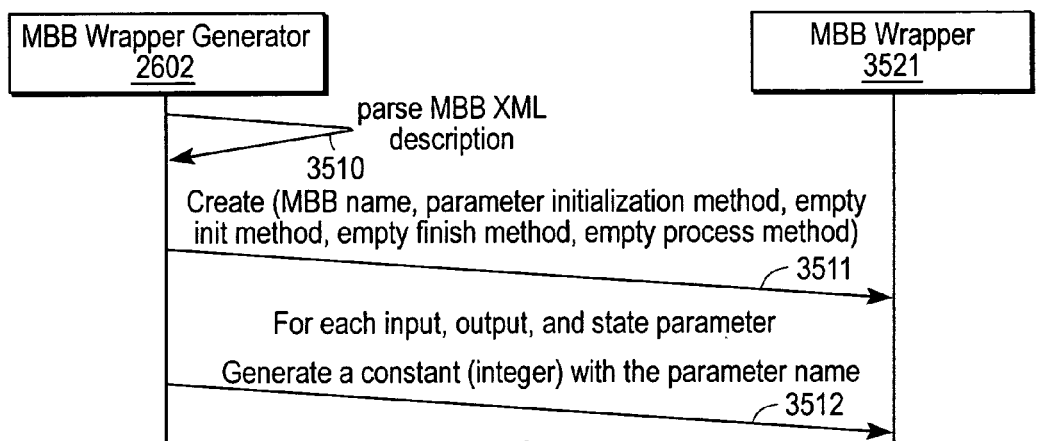
FIG. 35 is a flow diagram of one embodiment of a protocol to generate a MBB wrapper automatically.

FIG. 35 is a flow diagram of one embodiment of a protocol to generate a MBB wrapper automatically. MBB wrapper generator 2602 parses an MBB XML description (3510) and creates an MBB wrapper using a programming language specified by the user (3511). In Java, for example, the MBB wrapper is a class that inherits from MicroBuildingBlock, and has empty finish and process methods (which is code provided by, for example, a developer). Wrapper generator 2602 creates a list of constants (integers) with the name of the parameters. In one embodiment, these constants are used to index the parameters. Wrapper generator 2602 creates a method to initialize the value of these constants. This method is called automatically from the init method of MBB wrapper 3521, which is also created by MBB wrapper 3521 automatically.

Figure 36:
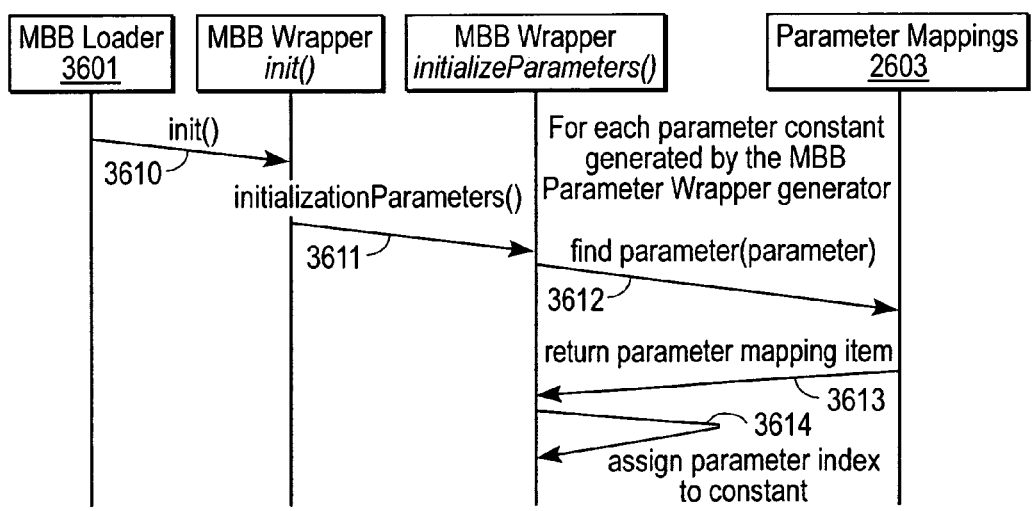
FIG. 36 is a flow diagram of one embodiment of a process for initialization of parameter indices.

FIG. 36 is a flow diagram of one embodiment of a process for initializing parameter indices. Referring to FIG. 36, when MBB loader 3601 creates a new MBB, it invokes the init method (3610). This method invokes the initialize parameters method (3611), which obtains the parameter mapping, retrieves the indices' values for each MBB parameter (3612 and 3613), and assigns these indices to the parameter constants (3614).

An Exemplary Communication Middleware Service

A multi-protocol Object Request Broker (ORB) communication middleware service built using MBBs will now be discussed. The service provides client and server functionality independently of wire protocols. That is, the server object's methods can be invoked over different protocols, such as IIOP, SOAP, or XML-RPC. Similarly, client requests use the same interface and semantics regardless of the underlying protocol. The implementation provides support for IIOP and XML-RPC. However, it is possible to add additional protocols by developing and deploying additional MBBs at runtime. Because ExORB's architecture (state, structure, and logic) is externalized, it is possible to inspect and manipulate ExORB's architecture at runtime.

Figure 37:
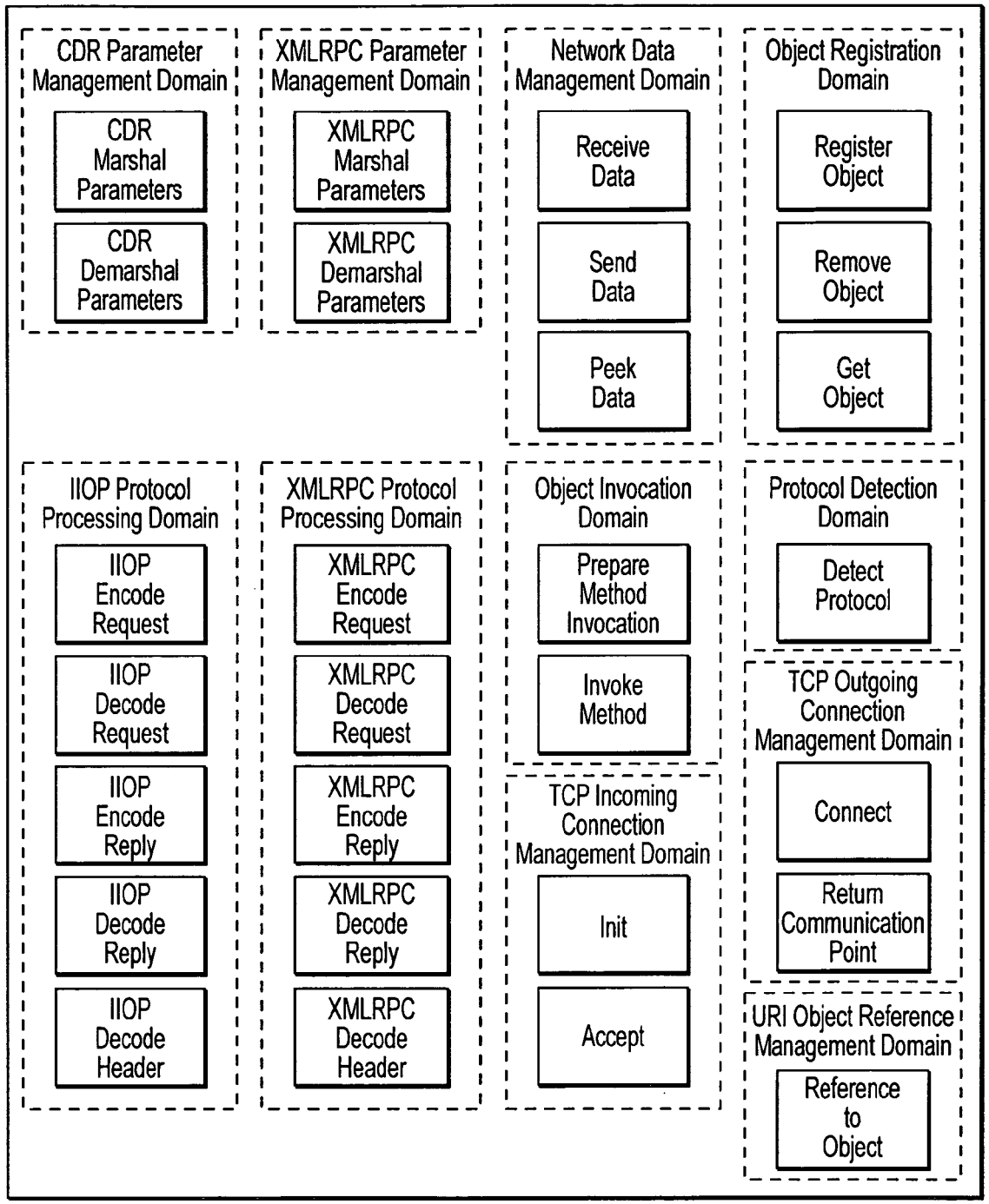
FIGS. 37–39 illustrate the construction of an exemplary reconfigurable communication middleware service.

ExORB is composed of 28 micro building blocks grouped into 11 domains. FIG. 37 illustrates the structure of ExORB.

Referring to FIG. 37, the CDR Parameter Management domain provides functionality to marshal and demarshal parameters according to the Common Data Representation (CDR) format (CORBA default representation). The CDR Marshal Parameters micro building block receives parameters and a CDR buffer encoding object, and returns a byte array containing the CDR representation of the parameters. The CDR Demarshal Parameters micro building block receives a byte buffer, an array with the list of the parameters' types to extract from the buffer, and a CDR buffer decoding object, and returns an array with the values of the objects.

The XMLRPC Parameter Management domain is similar to the CDR Parameter Management Domain but provides functionality to marshal and demarshal parameters encoded according to the XMLRPC protocol.

The IIOP Protocol Processing domain aggregates micro building blocks that export functionality to encode and decode messages that conform to the IIOP protocol. The IIOP Encode Request micro building block receives a list of marshaled parameters and a collection of request fields (for example, remote operation name, response expected, and request id), and generates a byte buffer formatted according to IIOP. The IIOP Decode Request micro building block receives a byte buffer with the incoming request in IIOP format and a collection of fields that describe the request message (for example, the length), parses the request, and generates a collection of attributes with information about the request, including the id of the request, the target object, the target method, and a byte buffer with the parameters. The IIOP Encode Reply and IIOP Decode Reply provide functionality to generate IIOP reply messages and to decode incoming IIOP reply messages. Finally, the IIOP Decode Header receives the original incoming request from the network (a byte buffer) and parses the 12 initial bytes, which constitute the GIOP header. This header contains information about the length of the remaining message, and the type of the message.

The XMLRPC Protocol Processing domain is equivalent to the IIOP Protocol Processing Domain and provides functionality to handle XMLRPC requests and replies.

The Network Data Management domain is responsible for handling incoming and outgoing network traffic. It is composed of three micro building blocks: Send Data, Receive Data, and Peek Data. The Send Data micro building block receives a buffer, its length, and a communication point object (for example, TCP socket), and sends the data over the network using the communication point. The Receive Data micro building block receives a buffer, the length of the data to receive, and a communication point object, and stores the data in the buffer using the communication point object to obtain the data. The Peek Data micro building block is similar to the receive data micro building block but it does not remove the data it reads from the network buffer.

The Object Invocation domain contains two micro building blocks to automate server method invocation using the Java language reflection capabilities. As a result of this functionality, developers do not need to build skeletons for their server objects but simply register them, and the system automatically obtains all the information it requires. The Prepare Method Invocation micro building block receives a pointer to an object and the name of the method to invoke. The micro building block uses Java reflection to inspect the method signature, creates an array with the parameter types required to invoke the method, and returns the array as the output parameter. The Invoke Method micro building block receives an array with the parameter values, invokes the object method, and returns an array with the parameters generated by the method.

The TCP Incoming Connection Management domain provides functionality to handle incoming TCP network connections. The Init micro building block receives an integer that specifies the port that ExORB uses to listen to requests. The Accept micro building block listens for incoming TCP requests, and if it does not receive any input parameter, it returns a TCP Communication Point object that encapsulates the network connection.

The TCP Outgoing Connection Management domain handles TCP connection establishment with remote peers. The domain includes two micro building blocks. The Connect micro building block receives a host name and a port, connects to the host, and returns a TCP Communication Point that encapsulates the network connection. The Return Communication Point micro building block receives a TCP Communication Point object and either closes it or caches it according to its caching algorithm.

The Object Registration domain is responsible for the management of server objects. The Register Object micro building block receives an object id and an object reference and stores the object in table. This table is a state attribute that is stored in the domain's state memory. The Remove Object micro building block receives an object id and removes the associated object from the table. The Get Object micro building block receives an object id and returns the reference to its associated object.

The Protocol Detection domain exports functionality to identify the communication middleware protocol of incoming requests. This functionality is required to support the multi-protocol behavior of ExORB. The Detect Protocol micro building block receives a byte buffer, parses this buffer, and returns a string with the name of the middleware protocol. Current implementation of the MBB detects two types of protocols: XMLPRC and IIOP.

The URI Object Reference Management domain provides functionality to parse a remote object URI reference and extract all required information to send requests to the remote object. This domain contains a single micro building block called Reference to Object, which receives a URI and a protocol type, and returns a host name, a port number, and the object id.

Table 1 lists the size of each ExORB domain (Java version). The total size, without debugging information is 70 KB.

TABLE 1

ExORB size.

| Domain | Size |
| --- | --- |
| CDR Parameter Management | 16 KB |
| XMLRPC Parameter Management | 20 KB |
| IIOP Protocol Processing | 7 KB |
| XMLRPC Protocol Processing | 8 KB |
| Network Data Management | 3 KB |
| Object Invocation | 2 KB |
| TCP Incoming Connection Management | 5 KB |
| TCP Outgoing Connection Management | 4 KB |
| Object Registration | 2 KB |
| Protocol Detection | 1 KB |
| URI Object Reference Management | 2 KB |

ExORB exports four actions: send request, receive request, init, and register object. The first one is intended for client-side functionality, while the remaining three (receive request, init, and register object) are intended for server-side functionality. Init object and register object are single node actions that invoke the init MBB and register object MBB.

Figure 38:
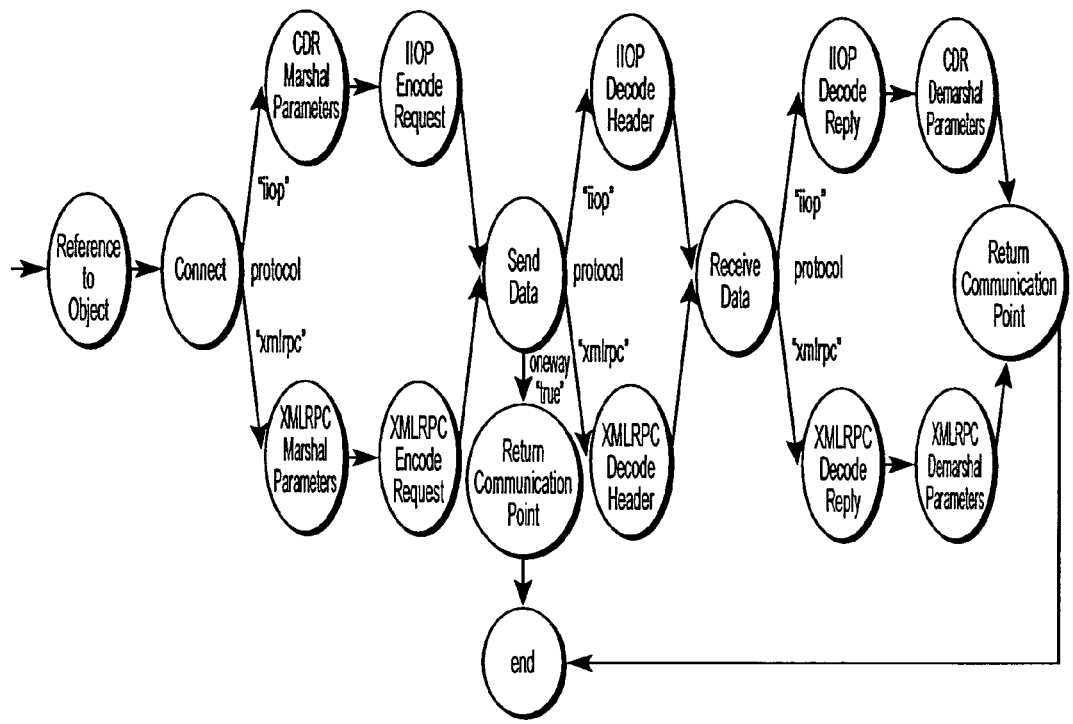

FIG. 38 illustrates the action graph for the send request action. For simplification, the error states have been removed. When the client object invokes the action, it provides an action state object (the one storing the parameters generated during the execution of the action) containing the name of the action, the remote object's reference, the method to invoke, the required parameters, and the protocol to use (that is, XMLRPC or IIOP). The action starts invoking the reference to object MBB that parses the remote object's reference and extracts the hostname, object id, and port. These parameters are stored in the action state object.

Next, the action invokes connect that obtains the hostname and port from the action state object, establishes a connection with the remote host (or reuses an existing connection), and stores an object that encapsulates the TCP socket (TCP Communication Point) in the action state object. The transition to the next state is conditional and depends on the value of the "protocol" variable stored in the action state object. If the value of the variable is "iiop", the action invokes CDR Marshal Parameters to marshal the parameters and then IIOP Encode Request MBB to create the request message. If the value of the variable is "xmlrpc", the action invokes XMLRPC Marshal Parameters and then XMLRPC Encode Request. Both IIOP Encode Request and XMLRPC Encode Request MBBs generate a byte buffer with the request formatted according to the appropriate protocol. The next state in the action graph is Send Data that retrieves the buffer from the action state object and sends it to the remote object using the TCP Communication Point object stored in the action state object. After invoking Send Data, the action retrieves a tuple named "oneway" from the action state object. If the value is "true", the action invokes Return Communication Point that disposes the TCP communication point object from the action state object, and finishes, returning the action state object to the action invoker.

If the value of "oneway" is "false", the action continues with the decoding of the reply. First, depending on the value of the "protocol" tuple, the action decodes an IIOP header, or an XMLRPC header. Both MBBs parse the message header and store information about the request in the action state object. One compulsory field for both MBBs is the length of the remaining of the reply. The action invokes Receive Data, which requires the length tuple to determine the amount of data that it has to read from the network. Next, the action proceeds with the decoding of the reply and the demarshaling of the parameters. Again, the action interpreter uses the value of "protocol" to decide what path to follow in the graph. Afterwards, the action invokes the Return Communication Point MBB (disposes the TCP communication point) and terminates, returning the actions state object to the action invoker. The action state object contains the result parameters.

Figure 39:
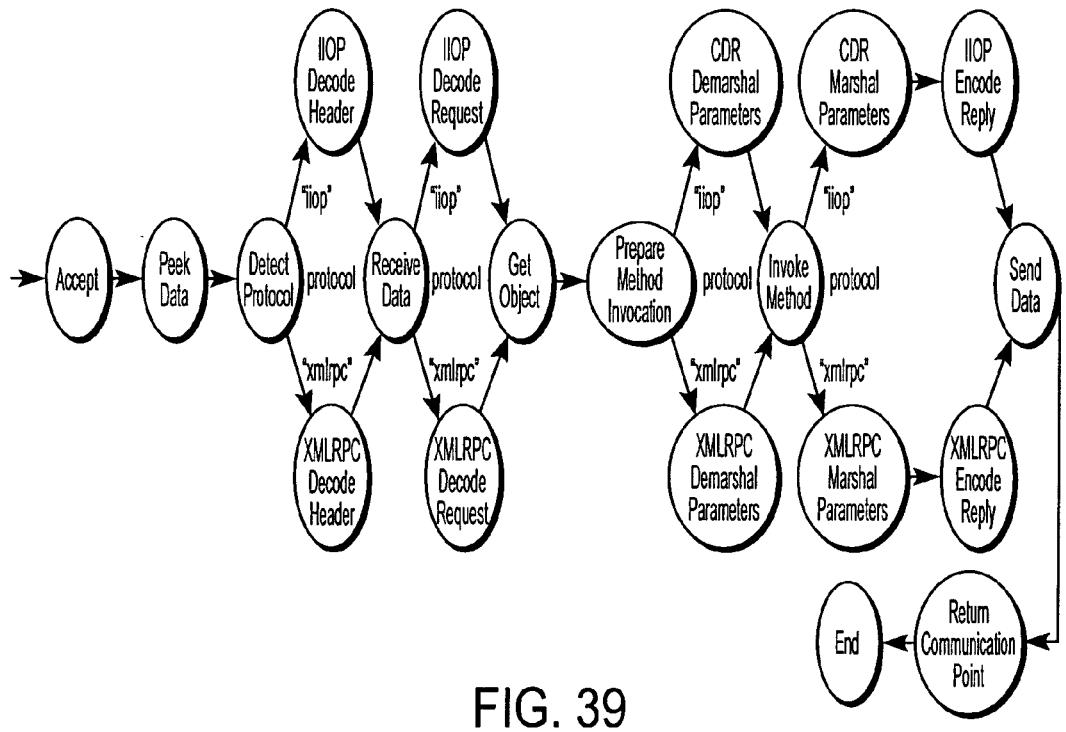

FIG. 39 depicts the action graph for receive request. The action starts invoking accept that blocks until it detects an incoming network request, and generates a TCP Communication Point that encapsulates the network connection. Next, the action invokes peek data that peeks into the incoming data buffer and parses the initial bytes to detect the type of protocol. If the protocol type is IIOP, the peek data MBB stores a tuple with the value "iiop" registered with the name "protocol". If the protocol type is XMLRPC, the MBB stores the value "xmlrpc" under the same name. Next, the action uses the "protocol" value to determine whether to jump to IIOP Decode Header or XMLRPC Decode Header. These two MBBs parse the header and extract information that they store in the action state object. Both MBBs must store a compulsory tuple named "length" that specifies the length of the remaining data. This value is used by the Receive Data MBB to obtain the remaining request data from the network buffer.

The action invokes IIOP Decode Request or XMLRPC Decode request, depending on the value of the "protocol" tuple stored in the action state object. Both MBBs generate a number of fields, including the id of the target object, and the name of the method. Next, the action invokes Get Object that uses the object id to locate the target object and stores its reference in the action state object. The prepare method invocation uses the target method name to inspect the parameters required to invoke the method using Java reflection. This MBB generates an array of parameter types. Next, depending on the value of "protocol", the action invokes CDR Demarshal Parameters or XMLRPC Demarshal Parameters, which use the previously generated array of types to demarshal the values from the incoming request. These two MBBs generate an array of parameter values. The invoke method MBB uses this array of values to invoke the target object's method, which is stored in the action state object. The invoke method MBB generates an array with the values of the output parameters. Next, the action uses the "protocol" value to marshal the output parameters and generate the reply message either in IIOP or XMLRPC. The IIOP Encode Reply and XMLRPC Encode Reply MBBs generate a byte buffer with the reply. The send data micro building block sends the reply to the client host using the TCP Communication Object stored in the action state object (which was generated with the accept micro building block). Afterwards, after sending the data, the action invokes return communication point, which disposes the TCP Communication point or stores in a cache depending on the caching algorithm.

As discussed above, the key feature of configurable software is the support for manipulating the software state as a first class object. In one embodiment, every MBB explicitly specifies its state dependencies defined in terms of name and value pairs. These tuples are stored in a storage area provided by the MBB domain. The state of the software is the union of all the MBBs' state attributes. Therefore, the state of ExORB consists of all the state attributes defined by the 28 micro building blocks.

Table 2 lists the state attributes associated with ExORB. The table includes the name of the attribute, its purpose, and the name of the domain that stores it.

TABLE 2

ExORB state attributes.

| | Domain | Purpose |
|---|---|---|
| Sent Data (long) | Network Data Management | Stores the total amount of bytes sent by ExORB. |
| Received Data (long) | Network Data Management | Stores the total amount of bytes received by ExORB. |
| Send Timeout (long) | Network Data Management | Value in milliseconds the send MBB waits before timing out. |
| Receive Timeout (long) | Network Data Management | Value in milliseconds the receive MBB waits before timing out. |
| Server Object Registry (hash table) | Object Registration | Stores the list of registered server objects. |
| Server Communication Point Cache (list) | TCP Incoming Connection Management | Stores a list of connected communication points. |
| Client Communication Point Cache (list) | TCP Outgoing Connection Management | Stores a list of connected communication points. |

An Exemplary Computer System

Figure 40:
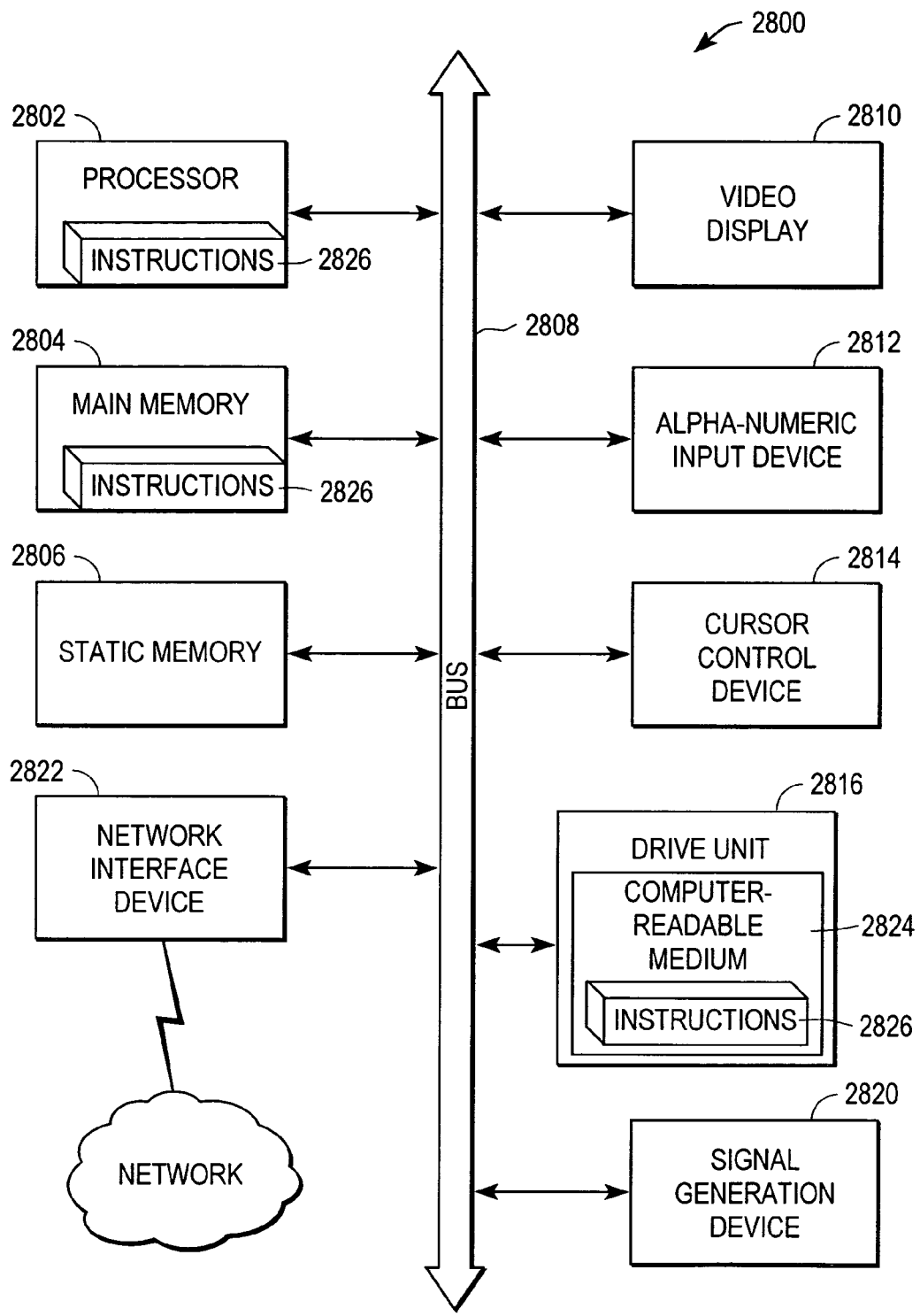
FIG. 40 is a block diagram of an exemplary computer system.

FIG. 40 is a block diagram of an exemplary computer system 2800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 4000 includes a processor 4002, a main memory 4004 and a static memory 4006, which communicate with each other via a bus 4008. The computer system 4000 may further include a video display unit 4010

(e.g., a liquid crystal display (LCD) or a cathode ray tube (CRT)). The computer system 4000 also includes an alphanumeric input device 4012 (e.g., a keyboard), a cursor control device 4014 (e.g., a mouse), a disk drive unit 4016, a signal generation device 4020 (e.g., a speaker) and a network interface device 4022.

The disk drive unit 4016 includes a computer-readable medium 4024 on which is stored a set of instructions (i.e., software) 4026 embodying any one, or all, of the methodologies described above. The software 4026 is also shown to reside, completely or at least partially, within the main memory 4004 and/or within the processor 4002. The software 4026 may further be transmitted or received via the network interface device 4022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

A software construction method and apparatus for assembling and configuring small execution units (micro building blocks) dynamically at run time has been described. Embodiments of the present invention may use externalization of execution elements such as state, structure and logic. Embodiments of the present are language and platform independent and provide for runtime configurability, updateability and upgradeability of software components, seamless mobility of software components, and increased reliability of constructed software.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
    a loader to obtain software structure data identifying a plurality of application components of an application associated with requested functionality and to obtain software logic data indicating interaction rules between the plurality of application components;
    a parameter index generator to parse a description file and generate an index for each parameter of the plurality of application components at run-time when the loader loads the software structure and the software logic;
    a memory to store a parameter mapping that maps input, output and state parameters associated with the plurality of application components to indices, generated by the parameter index generator, that are used by application components of the plurality of application components to access the input, output and state parameters; and
    a scheduler to coordinate an invocation of the plurality of application components at run time based on the software logic data and using the parameter mapping for index-based parameter access.

2. The apparatus defined in claim 1 further comprising a wrapper generator to generate a list of parameter constants that match names of at least two or more of the input, output and state parameters and initialize value of the constants with indices generated by the parameter index generator during initialization of the plurality of application components.

3. The apparatus defined in claim 2 wherein the wrapper generator generates the list of parameter constants in response to parsing the description file.

4. The apparatus defined in claim 1 wherein the description file comprises an XML description file.

5. The apparatus defined in claim 1 wherein the parameter mapping comprises a pointer array.

6. The apparatus defined in claim 1 wherein the parameter index generator updates the parameter mappings by adding or removing a parameter.

7. The apparatus defined in claim 1 wherein the parameter generator adds the first parameter by generating a new index for the first parameter automatically.

8. The apparatus defined in claim 7 wherein the parameter generator parses a description file; and, for each input, output and state parameter, the parameter generator
    examines parameter mappings to determine if the first parameter exists;
    if first parameter does not exist, generates a new parameter mapping item, assigns a new index, and generates a new index value, and
    if the first parameter does exist, increases a reference counter that indicates a number of references to the first parameter that exist by application components.

9. The apparatus defined in claim 6 wherein the parameter generator removes a first parameter by eliminating the first parameter and updating its associated index based on the number of application components using the first parameter.

10. The apparatus defined in claim 9 wherein the parameter generator removes a parameter by
    obtaining a parameter mapping item from the parameter mappings;
    decreasing a reference counter that indicates a number of references to the parameter that exist by application components; and
    removing the parameter mapping index if the reference counter indicates no application components are using the parameter.

11. An apparatus comprising:
    a loader to obtain software structure data identifying a plurality of application components of an application associated with requested functionality and to obtain software logic data indicating interaction rules between the plurality of application components, wherein the loader obtains software parameter data for each of the plurality of application components using index-based parameter access that uses one or more indices aenerated at run-time when the loader loads the software structure;
    a memory to store the software structure data and the software logic data including index-to-parameter constant assignments; and
    a scheduler to coordinate an invocation of the plurality of application components at run time based on the software logic data and using one or more of the index-to-parameter constant assignments, and using the index-based parameter access.

12. The apparatus of claim 11 wherein the loader is to obtain the software logic data by receiving a definition of software logic indicating the interaction rules between the plurality of application components, and parsing the definition of the software logic.

13. The apparatus of claim 11 wherein the software logic data comprises an identifier of an action object and a reference to an action object for each action referenced in the definition of the software logic.

14. The apparatus of claim 11 wherein the requested functionality comprises requested wireless functionality.

15. The apparatus of claim 11 wherein the software structure data comprises an identifier of each of the plurality of application components and a reference to each of the plurality of application components.

16. The apparatus of claim 11 wherein said each of the plurality of application components is an object.

17. The apparatus defined in claim 11 further comprising a parameter index generator to parse a description file and generate an index for each input, output and state parameters of the plurality of application components.

18. The apparatus of claim 11 wherein the parameter index generator updates the parameter mappings by adding or removing a parameter.

19. The apparatus defined in claim 18 wherein the parameter generator parses the description file; and, for each input, output and state parameter, the parameter generator
   examines parameter mappings to determine if the parameter exists;
   if a parameter does not exist, generates a new parameter mapping item, assigns a new index, and generates a new index value and
   if the parameter does exist, increases a reference counter that indicates a number of references to the parameter that exist by application components.

20. The apparatus defined in claim 18 wherein the parameter generator removes a parameter by eliminating a parameter and updating its associated index based on the number of application components using the parameter.

21. The apparatus defined in claim 20 wherein the parameter generator removes a parameter by
   obtaining a parameter mapping item from the parameter mappings;
   decreasing a reference counter that indicates a number of references to the parameter that exist by application components; and
   removing the parameter mapping index if the reference counter indicates no application components are using the parameter.

22. The apparatus defined in claim 11 further comprising a wrapper generator to generate a list of parameter constants that match names of parameters and initialize value of the constants with indices during initialization of the plurality of application components.

23. The apparatus defined in claim 22 wherein the wrapper generator generates the list of parameter constants in response to parsing a description file.

24. The apparatus defined in claim 11 wherein the description file comprises an XML description file.

25. A method comprising:
   obtaining software structure data identifying a plurality of application components of an application associated with requested functionality and to obtain software logic data indicating interaction rules between the plurality of application components,
   automatically generating, at run-time, indices for a plurality of parameters used by one or more of a plurality application components;
   maintaining a mapping between names of the plurality of parameters and their associated indices;
   assigning the indices to at least one application component of the application during initialization;
   accessing each of one or more of the plurality of parameters from an array using an index as set forth in the mapping; and
   coordinating an invocation of the plurality of application components at run time using the one or more parameters accessed from the array using their associated index.

* * * * *